US012058480B2

(12) United States Patent
Yang et al.

(10) Patent No.: US 12,058,480 B2
(45) Date of Patent: Aug. 6, 2024

(54) LINK ESTABLISHMENT METHOD AND APPARATUS, AND COMPUTER READABLE STORAGE MEDIUM

(71) Applicant: ZTE CORPORATION, Guangdong (CN)

(72) Inventors: Wei Yang, Guangdong (CN); Bo Yang, Guangdong (CN); Huannan Ma, Guangdong (CN); Xiangrong Chen, Guangdong (CN); Yufeng Li, Guangdong (CN); Liquan Yuan, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 17/865,318

(22) Filed: Jul. 14, 2022

(65) Prior Publication Data
US 2022/0353591 A1 Nov. 3, 2022

Related U.S. Application Data

(63) Continuation of application No. 17/284,755, filed as application No. PCT/CN2019/110874 on Oct. 12, 2019, now Pat. No. 11,445,277.

(30) Foreign Application Priority Data

Oct. 12, 2018 (CN) .......................... 201811189142.1

(51) Int. Cl.
*H04J 14/02* (2006.01)
*H04B 10/50* (2013.01)
(Continued)

(52) U.S. Cl.
CPC ......... *H04Q 11/0062* (2013.01); *H04B 10/50* (2013.01); *H04J 14/02* (2013.01);
(Continued)

(58) Field of Classification Search
CPC ......................... H04Q 11/0062; H04J 14/0238
See application file for complete search history.

(56) References Cited

U.S. PATENT DOCUMENTS

RE39,812 E    9/2007  Edem et al.
7,502,563 B2  3/2009  Nozue et al.
(Continued)

FOREIGN PATENT DOCUMENTS

CN    1925370 A     3/2007
CN    101355387 A   1/2009
(Continued)

OTHER PUBLICATIONS

European Patent Office, EP19871803.3 Extended European Search Report issued on Jul. 1, 2022.
(Continued)

*Primary Examiner* — Shi K Li
(74) *Attorney, Agent, or Firm* — Li & Cai Intellectual Property (USA) Office

(57) ABSTRACT

Provided are a link establishment method and apparatus and a computer-readable storage medium. The link establishment method includes: exchanging optical link auto-negotiation information with a terminal device through an optical link auto-negotiation channel; and in a case where exchanging the optical link auto-negotiation information is finished, establishing at least one of a traffic data channel or an optical link auto-negotiation channel; where the optical link auto-negotiation channel is independent of the traffic data channel or the optical link auto-negotiation channel; and the optical link auto-negotiation information includes at least one of
(Continued)

information about an operating wavelength channel of the terminal device, an enabled or disabled state of forward error correction with the terminal device, a forward error correction type with the terminal device, or an operating mode of the auxiliary management channel.

16 Claims, 12 Drawing Sheets

(51) Int. Cl.
  *H04L 1/00* (2006.01)
  *H04Q 11/00* (2006.01)
(52) U.S. Cl.
  CPC .... *H04L 1/0061* (2013.01); *H04Q 2011/0069* (2013.01); *H04Q 2011/0079* (2013.01)

(56) References Cited

U.S. PATENT DOCUMENTS

| | | | |
|---|---|---|---|
| 11,445,277 B2* | 9/2022 | Yang | ................. H04B 10/50 |
| 2007/0092256 A1 | 4/2007 | Nozue et al. | |
| 2010/0183308 A1* | 7/2010 | Gerstel | ............... H04J 14/0267 398/79 |
| 2016/0099792 A1* | 4/2016 | Gao | ................. H04J 14/0246 398/68 |
| 2016/0248520 A1* | 8/2016 | Sarashina | ............ H04B 10/572 |
| 2017/0237518 A1 | 8/2017 | Yang | |
| 2017/0279538 A1* | 9/2017 | Sone | ................ H04B 10/25754 |
| 2020/0072806 A1* | 3/2020 | Leo | .................... G01N 33/0009 |
| 2020/0366374 A1* | 11/2020 | Liu | ...................... H04B 10/564 |

FOREIGN PATENT DOCUMENTS

| | | | | |
|---|---|---|---|---|
| CN | 102104812 A | 6/2011 | | |
| KR | 20040077250 A | 9/2004 | | |
| WO | WO-2009012728 A1 * | 1/2009 | ........... | H04B 10/272 |
| WO | WO 2009012728 A1 | 1/2009 | | |

OTHER PUBLICATIONS

WIPO, International Search Report issued on Jan. 10, 2020.
U.S. Appl. No. 17/284,755 First Office Action (OA1) issued on Jan. 18, 2022.

* cited by examiner

LINK ESTABLISHMENT METHOD AND APPARATUS, AND COMPUTER READABLE STORAGE MEDIUM

CROSS-REFERENCE TO RELATED APPLICATIONS

This application is a continuation application of U.S. patent application Ser. No. 17/284,755, filed on Apr. 12, 2021, a National Stage Application filed under 35 U.S.C. 371 based on International Patent Application No. PCT/CN2019/110874, filed on Oct. 12, 2019, which claims priority to Chinese Patent Application No. 201811189142.1 filed on Oct. 12, 2018, the disclosures of all of which are incorporated herein by reference in their entireties.

TECHNICAL FIELD

The present disclosure relates to the field of optical communication, for example, a link establishment method and apparatus and a computer-readable storage medium.

BACKGROUND

With the advent of the 5th generation mobile communication technology (5G), uses put increasing requirements on data bandwidth and latency and accordingly put increasing requirements on optical access devices for wireless fronthaul. One method for increasing bandwidth is to modulate data onto multiple wavelength channels by use of a wavelength-division multiplexing (WDM) technology, where each wavelength channel has a certain bandwidth and the multiple wavelength channels increase a communication capacity. Compared with time-division multiplexing (TDM), WDM has another advantage of no time slot allocation, corresponds to point-to-point transmission, and reduces latency. Therefore, the wavelength-division multiplexing is well applicable to a 5G fronthaul network.

In the related art, a method in which a tunable optical module of a terminal device is used for scanning wavelengths one by one for search has the issues of a very long link establishment process and crosstalk generated with other operating wavelength channels. An auxiliary management channel (Head-to-Tail Message Channel (HTMC)) carrying wavelength information is defined in International Telecommunication Union Telecommunication Standardization Sector (ITU-T) Standard G.698.4. However, the HTMC is implemented by a pilot tone modulation technology of an optical signal, which increases the complexity and cost of an optical module, decreases the signal quality of an optical link, and introduces a non-negligible optical power cost.

SUMMARY

Embodiments of the present disclosure provide a link establishment method and apparatus and a computer-readable storage medium, which can perform link establishment for a traffic data channel without increasing the complexity and cost of an optical module and without deteriorating the signal quality of the traffic data channel.

An embodiment of the present disclosure provides a link establishment method including steps described below.

Optical link auto-negotiation information is exchanged with a terminal device through an optical link auto-negotiation channel.

In a case where exchanging the optical link auto-negotiation information is finished, at least one of a traffic data channel or an auxiliary management channel is established.

The optical link auto-negotiation channel is independent of the traffic data channel or the auxiliary management channel; and the optical link auto-negotiation information includes at least one of information about an operating wavelength channel of the terminal device, an enabled or disabled state of forward error correction between a central office device and the terminal device, a forward error correction type between a central office device and the terminal device, or an operating mode of the auxiliary management channel.

An embodiment of the present disclosure provides a link establishment method including steps described below.

Optical link auto-negotiation information is exchanged with a central office device through an optical link auto-negotiation channel.

In a case where exchanging the optical link auto-negotiation information is finished, at least one of a traffic data channel or an auxiliary management channel is established.

The optical link auto-negotiation channel is independent of the traffic data channel or the auxiliary management channel; and the optical link auto-negotiation information includes at least one of information about an operating wavelength channel of a terminal device, an enabled or disabled state of forward error correction between the central office device and a terminal device, a forward error correction type between the central office device and a terminal device, or an operating mode of the auxiliary management channel.

An embodiment of the present disclosure provides a link establishment apparatus. The link establishment apparatus includes a first optical link auto-negotiation channel communication module and a first optical module which constitute an optical link auto-negotiation channel.

The first optical link auto-negotiation channel communication module is configured to exchange optical link auto-negotiation information with a terminal device through the optical link auto-negotiation channel.

The optical link auto-negotiation channel is independent of a traffic data channel or an auxiliary management channel; and the optical link auto-negotiation information includes at least one of information about an operating wavelength channel of the terminal device, an enabled or disabled state of forward error correction between a central office device and the terminal device, a forward error correction type between a central office device and the terminal device, or an operating mode of the auxiliary management channel.

An embodiment of the present disclosure provides a link establishment apparatus.

The link establishment apparatus includes a second optical link auto-negotiation channel communication module and a second optical module which constitute an optical link auto-negotiation channel.

The second optical link auto-negotiation channel communication module is configured to exchange optical link auto-negotiation information with a central office device through the optical link auto-negotiation channel.

The optical link auto-negotiation channel is independent of a traffic data channel or an auxiliary management channel; and the optical link auto-negotiation information includes at least one of information about an operating wavelength channel of a terminal device, an enabled or disabled state of forward error correction between the central office device and a terminal device, a forward error correction type between the central office device and a terminal device, or an operating mode of the auxiliary management channel.

An embodiment of the present disclosure provides a link establishment apparatus including at least one processor and at least one computer-readable storage medium, where the at least one computer-readable storage medium stores instructions which are executed by the at least one processor so that any one of the preceding methods is performed.

An embodiment of the present disclosure provides a computer-readable storage medium, which is configured to store a computer program which is executed by a processor so that any one of the preceding methods is performed.

DETAILED DESCRIPTION

Embodiments of the present disclosure will be described hereinafter in conjunction with drawings. If not in collision, the embodiments of the present disclosure and features therein may be combined with each other.

The steps illustrated in the flowcharts among the drawings may be performed by, for example, a computer system capable of executing a set of computer-executable instructions. Moreover, although logical sequences are illustrated in the flowcharts, the illustrated or described steps may be performed in sequences different from those described herein in some cases.

Figure 1:
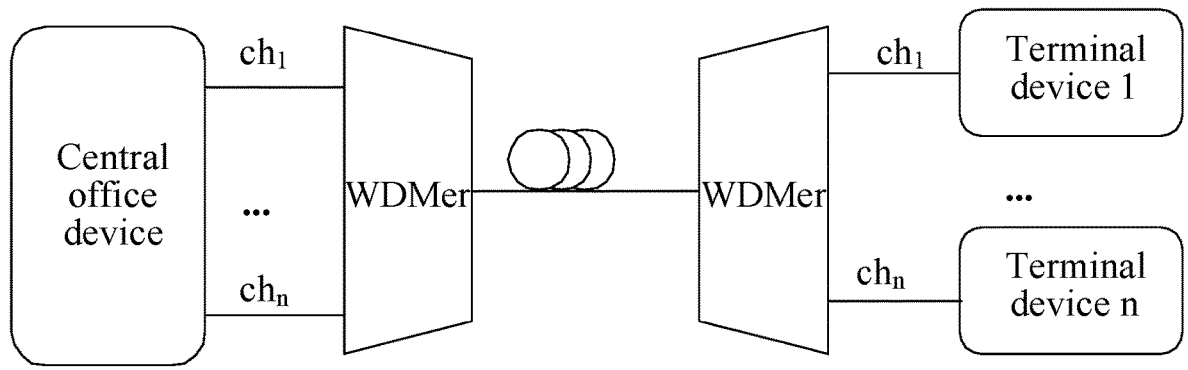
FIG. 1 is a schematic diagram of a wavelength-division multiplexing access network in the related art.

FIG. 1 is a schematic diagram of a wavelength-division multiplexing access network. As shown in FIG. 1, to save a backbone fiber, a wavelength division multiplexer (WDMer) is used at a central office device and a terminal device separately to combine optical waves with multiple wavelengths into one backbone fiber. The WDMer may be implemented by using arrayed waveguide gratings (AWGs) or other devices. When the central office device is an optical line terminal (OLT) and the terminal device is an optical network unit (ONU), the wavelength-division multiplexing access network is a wavelength-division multiplexing passive optical network (WDM PON). The wavelength-division multiplexing access network may also be a Centralized Radio Access Network (C-RAN). Then, the central office device is a building baseband unit (BBU) or a distributed unit (DU) and the terminal device is a radio remote unit (RRU) or an active antenna unit (AAU). Optical signals with different wavelengths are sent and received by optical modules for different wavelengths, which are connected to different ports of the WDMer.

Generally, in order to save warehousing costs and operation and maintenance costs, the terminal device uses a tunable optical module to unify a model and facilitate installation and maintenance. However, the use of the tunable optical module requires the terminal device to tune its own tunable optical module to a correct emission wavelength to be connected to the WDMer when the terminal device is turned on so that wavelength link establishment for an optical link is implemented. In the related art, a method in which the tunable optical module of the terminal device is used for scanning wavelengths one by one for search has the issues of a very long link establishment process and crosstalk generated with other operating wavelength channels. An auxiliary management channel (Head-to-Tail Message Channel (HTMC)) carrying wavelength information is defined in International Telecommunication Union Telecommunication Standardization Sector (ITU-T) Standard G.698.4. However, the HTMC is implemented by a pilot tone modulation technology of an optical signal, which increases the complexity and cost of an optical module, decreases the signal quality of an optical link, and introduces a non-negligible optical power cost. Generally, a rate is as low as about 100 Kbps.

On the other hand, when the terminal device and the central office device are WDM PON devices, the transparent transmission of carried radio traffic is required. In addition to the issue of a long wavelength link establishment process of the tunable optical module of the terminal device, the auxiliary management channel is required to transfer management messages such as Operation Administration and Maintenance (OAM) information, error statistics and link loopback between the central office device and the terminal device. Two technical routes for auxiliary management: a transparent auxiliary management and control channel (AMCC) and a transcoded AMCC in point-to-point (PtP) WDM architecture are defined in ITU-T Standard G.989.3.

The transparent AMCC is similar to G.698.4 and transmits auxiliary management information such as wavelengths using the pilot tone modulation technology of the optical signal. The transcoded AMCC is implemented at a Physical Coding Sublayer (PCS) (including a forward error correction (FEC) sublayer). When a traffic data channel is in an 8B/10B coding format, the auxiliary management channel is provided using a transcoding technique from 8B/10B to 32B/34B. When the traffic data channel is in a 64B/66B coding format, information about the auxiliary management channel is carried in an RS (253,221) FEC check bit synchronization header.

In addition to two schemes defined in the above standards, the information about the auxiliary management channel may also be carried by other redundancy information (such as an idle control word) in the PCS. With respect to the transparent AMCC, a WDM PON auxiliary management channel (hereinafter collectively referred to as the transcoded AMCC and not limited to two transcoded AMCCs defined in Standard G.989.3), which is implemented based on the PCS, will not introduce an additional optical power cost, can provide an auxiliary management channel with a higher rate, has better AOM functions, and therefore has an application advantage. However, the transcoded AMCC is closely related to a coding format, an FEC type, and an enabled or disabled state of FEC. When the WDM PON is used for a radio bearer, different traffic types such as a Common Public Radio Interface (CPRI), an enhanced Common Public Radio Interface (eCPRI), and Ethernet are carried. Traffic data channels transmitted by radio devices connected to the WDM PON central office device and the WDM PON terminal device, such as the BBU/DU and the RRU/AAU, adopt different rate levels, coding formats, FEC types, and enabled or disabled states of FEC. Therefore, on the required operating wavelength channel, when the traffic type carried in the WDM PON, a rate level, a coding format, an FEC type, an enabled or disabled state of FEC, and an enabled or disabled state of FEC of the WDM PON itself are unclear, the transcoded AMCC cannot parse the information about the auxiliary management channel sent by a peer end so that link establishment cannot be implemented for the auxiliary management channel and the traffic data channel.

In the related art, it is necessary to modify a traffic protocol standard of a bearer to parse the information about the auxiliary management channel by using the transparent AMCC or the traffic data channel (such as a PCS optical port auto-negotiation mechanism defined in Ethernet standard IEEE802.3 Clause) so that the issues of increased complexity of the tunable optical module, deteriorated transmission performance of the optical link, or a failure to perform the transparent transmission of traffic are introduced.

Figure 2:
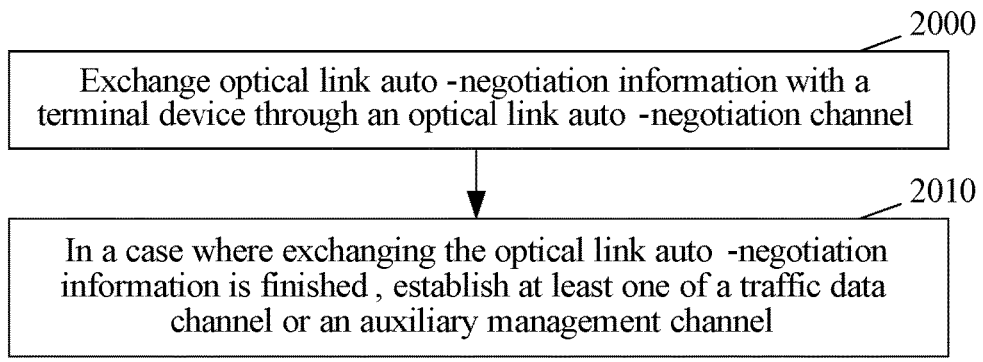
FIG. 2 is a flowchart of a link establishment method according to an embodiment of the present disclosure.

Referring to FIG. 2, an embodiment of the present disclosure provides a link establishment method applied to a central office device and including steps 2000 and 2010.

In step 2000, optical link auto-negotiation information is exchanged with a terminal device through an optical link auto-negotiation channel.

In the embodiment of the present disclosure, the optical link auto-negotiation channel is independent of a traffic data channel or an auxiliary management channel.

That is to say, at the same time, only one of the traffic data channel or the optical link auto-negotiation channel can transmit data on an optical link. For example, the optical link auto-negotiation information may be transmitted before the transmission of a traffic data channel message, after the traffic data channel message is interrupted due to a fault, or before the traffic data channel is restarted after its shutdown. A rate, frequency, coding mode, or the like of the optical link auto-negotiation information transmitted through the optical link auto-negotiation channel is independent of the traffic data channel. That is, the optical link auto-negotiation information transmitted through the optical link auto-negotiation channel may adopt a rate, coding mode, or the like that is the same as or different from that of traffic data.

When information about the auxiliary management channel is transmitted, at the same time, only one of the optical link auto-negotiation channel or the auxiliary management channel transmits data on the optical link; and the rate, frequency, coding mode, or the like of the optical link auto-negotiation information transmitted through the optical link auto-negotiation channel is independent of the auxiliary management channel.

The traffic data channel is also referred to as a user data channel.

The auxiliary management channel is a WDM PON system management channel between the central office device and the terminal device in a WDM PON system, which operates at a different bandwidth from the traffic data channel when operating normally at the same time with the traffic data channel.

The auxiliary management channel is used for transmitting WDM PON system registration and authentication, OAM management messages, alarm reporting, performance statistics, link loopback, feedback information for the optical link auto-negotiation information, and the like.

In the embodiment of the present disclosure, the optical link auto-negotiation information includes at least one of information about an operating wavelength channel of the terminal device, an enabled or disabled state of forward error correction (FEC) between the central office device and the terminal device, an FEC type between the central office device and the terminal device, or an operating mode of the auxiliary management channel.

In another embodiment of the present disclosure, the optical link auto-negotiation information further includes at least one of a communication protocol, information about a rate of the optical link auto-negotiation channel, or traffic information carried in the traffic data channel.

The traffic information carried in the traffic data channel includes at least one of: a traffic type, rate information (information about a rate of the traffic data channel), a coding format, an FEC type (such as Reed-Solomon (RS) (528,514), RS (544,514), RS (255,223), and a low-density parity-check (LDPC) code) between the central office device or the terminal device and a traffic device (such as a radio device), an enabled or disabled state of FEC between the central office device or the terminal device and the traffic device, or the like.

In the embodiment of the present disclosure, the step in which the optical link auto-negotiation information is exchanged with the terminal device through the optical link auto-negotiation channel includes steps described below.

At least one of a plurality of contents included in the optical link auto-negotiation information is sent to the terminal device through the optical link auto-negotiation channel. In a case of receiving feedback information from the terminal device, an exchange of a sent content included in the optical link auto-negotiation information is finished. The preceding process is repeated until exchanges of all the plurality of contents included in the optical link auto-negotiation information are finished.

The exchanges of all the optical link auto-negotiation information may be finished once or may be finished twice or more than twice. That is, a part of the optical link auto-negotiation information (at least one piece of optical link auto-negotiation information) is exchanged each time, and after feedback information for this part of the optical link auto-negotiation information is received, another part of the optical link auto-negotiation information is sent until the exchanges of all the optical link auto-negotiation information are finished.

The optical link auto-negotiation information may be sent periodically, or the optical link auto-negotiation information may be sent aperiodically, or the optical link auto-negotiation information may be sent regularly.

When the optical link auto-negotiation information is sent periodically, if the feedback information is received in a period, the exchange of the sent optical link auto-negotiation information is finished; if no feedback information is received in the period, the exchange of the sent optical link auto-negotiation information fails. In this case, the optical link auto-negotiation information that fails to be exchanged or other optical link auto-negotiation information may be sent in a next period.

When the optical link auto-negotiation information is sent aperiodically or regularly, if the feedback information is received before the next time the optical link auto-negotiation information is sent, the exchange of the sent optical link auto-negotiation information is finished; if no feedback information is received before the next time the optical link auto-negotiation information is sent, the exchange of the sent optical link auto-negotiation information fails. In this case, the optical link auto-negotiation information that fails to be exchanged may be exchanged again or other optical link auto-negotiation information may be sent.

In the embodiment of the present disclosure, the optical link auto-negotiation information may be sent by using an optical link auto-negotiation information frame (a signal with a frame format), where the optical link auto-negotiation information frame includes one of: a preamble, at least one delimiting indicator, and at least one of the plurality of contents included in the optical link auto-negotiation information; or a start identifier, an end identifier, at least one delimiting indicator, and at least one of the plurality of contents included in the optical link auto-negotiation information.

Alternatively, the sent optical link auto-negotiation information may not have the frame format.

Figure 3:
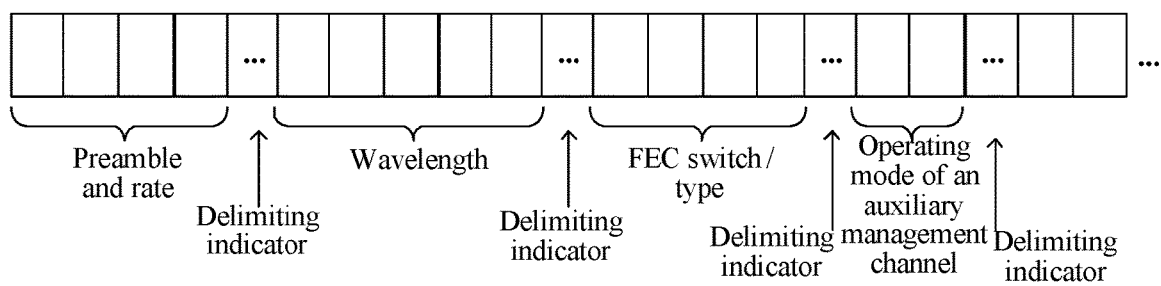
FIG. 3 is a schematic diagram of a format or a frame format of an optical link auto-negotiation information frame according to an embodiment of the present disclosure.

FIG. 3 is a schematic diagram of a format or a frame format of the optical link auto-negotiation information frame. When the optical link auto-negotiation information frame is used for sending the optical link auto-negotiation information, as shown in FIG. 3, a frame structure of the optical link auto-negotiation information frame includes the preamble and at least one optical link auto-negotiation information field, each of which carries one of the plurality of contents included in the optical link auto-negotiation information.

The preamble is used for the terminal device to perform synchronization. For example, a sequence of alternate bits 0101 . . . may be used.

Each optical link auto-negotiation information field is preceded by one delimiting indicator for isolating different optical link auto-negotiation information fields and for indicating which type of optical link auto-negotiation information a next optical link auto-negotiation information field is.

The end of the optical link auto-negotiation information field may be added with a check field to prevent an error.

Possible examples of a plurality of optical link auto-negotiation information fields in the optical link auto-negotiation information frame are listed in Table 1. Of course, the given examples are not intended to limit a value range of each field, and each field may have other values which are not to limit the scope of the embodiments of the present disclosure. The details are not repeated here.

TABLE 1

| Field Name | Binary Example |
|---|---|
| Preamble | 01010101 |
| Rate of the optical link auto-negotiation channel | This field may be directly derived during synchronization according to the preamble or set separately. |
| Information on the operating wavelength channel | ch1: 000001, ch2: 000010, ch3: 000011. . . |
| Enabled or disabled state of FEC of the WDM PON itself (on or off state of FEC between the central office device and the terminal device) | Enabled: 01, disabled: 00; |
| FEC type of the WDM PON itself (FEC type between the central office device and the terminal device) | RS (528,514): 0001, RS (544,514): 0010, RS (255,223): 0011, LDPC: 0100, . . . |
| Operating mode of the auxiliary management channel | Mode one: 0001, mode two: 0010, . . . |
| Communication protocol | PON: 00, CPRI: 01, eCPRI: 10, Ethernet: 11, . . . |
| Rate of the traffic data channel | 10G: 00, 25G: 01 |
| Enabled or disabled state of FEC between a WDM PON device and the traffic device | Enabled: 01, disabled: 00; |
| Delimiting indicator | Wavelength: 110011, FEC: 110111, protocol: 111011, operating mode of the auxiliary management channel: 111111, WDM PON rate: 111101, etc. |

In the preceding structure of the optical link auto-negotiation information frame, an information bit 1 or 0 may be represented by a high level or a low level or by a "level rising edge" or a "level falling edge".

The operating mode of the auxiliary management channel may include operating categories as shown in Table 2.

TABLE 2

| Operating Mode | Operating Principle |
|---|---|
| Mode one | After receiving traffic data information, the WDM PON device performs serial-to-parallel conversion, FEC signal synchronization, FEC decoding, PCS descrambling, and PCS synchronization on the received traffic data information, performs PCS scrambling, parallel-to-serial conversion, and transmission on traffic data and auxiliary management channel data that are multiplexed at the PCS. |
| Mode two | After receiving traffic data information, the WDM PON device performs serial-to-parallel conversion, FEC signal synchronization, FEC decoding, PCS descrambling, and PCS synchronization on the received |

TABLE 2-continued

| Operating Mode | Operating Principle |
|---|---|
| | traffic data information and performs PCS scrambling, FEC coding, parallel-to-serial conversion, and transmission on traffic data and auxiliary management channel data that are multiplexed at the PCS. |
| Mode three | After receiving traffic data information, the WDM PON device performs serial-to-parallel conversion, FEC signal synchronization on the received traffic data information and performs parallel-to-serial conversion and transmission on traffic data and auxiliary management channel data that are multiplexed at an FEC layer. |
| ... | ... |

In the embodiment of the present disclosure, the optical link auto-negotiation information is sent at any one of an agreed rate, a rate for characterizing the rate of the traffic data channel, a rate negotiated with the terminal device, or a rate that is an integer multiple of a reference clock for clock data recovery.

The rate for characterizing the rate of the traffic data channel includes any one of: a rate corresponding to the rate of the traffic data channel, a rate corresponding to a wavelength of the traffic data channel, or the rate that is an integer multiple of the reference clock for clock data recovery (CDR).

In a case where the optical link auto-negotiation information is sent at the rate for characterizing the rate of the traffic data channel, the rate of the optical link auto-negotiation channel is used for characterizing the rate of the traffic data channel, and the optical link auto-negotiation information includes the rate of the traffic data channel or does not include the rate of the traffic data channel.

When the optical link auto-negotiation information is not sent at the rate for characterizing the rate of the traffic data channel, the rate of the optical link auto-negotiation channel does not characterize the rate of the traffic data channel, and the optical link auto-negotiation information may be sent at a fixed rate or at different rates. When the optical link auto-negotiation information is sent at the rate for characterizing the rate of the traffic data channel, the rate of the optical link auto-negotiation channel characterizes the rate of the traffic data channel, and the optical link auto-negotiation channel is sent at different rates to adapt to different rates of the traffic data channel.

When the optical link auto-negotiation information is not sent at the rate for characterizing the rate of the traffic data channel, the optical link auto-negotiation information need not include the information about the rate of the optical link auto-negotiation channel. When the optical link auto-negotiation information is sent at the rate for characterizing the rate of the traffic data channel, the information about the rate of the optical link auto-negotiation channel may be added to the optical link auto-negotiation information, and the rate of the optical link auto-negotiation channel may be negotiated at a start stage of the exchange of the optical link auto-negotiation information. For example, the central office device sends the optical link auto-negotiation information to the terminal device, and a rate of the optical link auto-negotiation information is a lowest rate at which the terminal device can perform reception, so as to reduce the probability of an error of the optical link auto-negotiation information during transmission. The optical link auto-negotiation information includes a rate information field of the optical link auto-negotiation channel, and rate information includes both a sending rate and a receiving rate. The terminal device determines whether the optical link auto-negotiation channel of the terminal device can operate at a rate according to the content of a rate field of the optical link auto-negotiation channel in the optical link auto-negotiation information. If the optical link auto-negotiation channel can operate at the rate, the terminal device sends a feedback message to the central office device. If the optical link auto-negotiation channel cannot operate at the rate, the terminal device sends rates at which the optical link auto-negotiation channel of the terminal device can operate to the central office device, and the central office device selects a rate from the received rates at which the optical link auto-negotiation channel of the terminal device can operate and sends the optical link auto-negotiation information to the terminal device at the selected rate. If there is no appropriate rate, an error is reported.

In the embodiment of the present disclosure, the optical link auto-negotiation information may also be sent through information pulses interleaved with clock pulses, where the information pulse carries at least one of the plurality of contents included in the optical link auto-negotiation information. An implementation process is shown in example five. The details are not repeated here.

Alternatively, the information about the operating wavelength channel of the terminal device is sent through the number of optical pulses, where the number of optical pulses is used for characterizing the information about the operating wavelength channel of the terminal device. An implementation process is shown in Example six. The details are not repeated here.

In step 2010, in a case where exchanging the optical link auto-negotiation information is finished, at least one of the traffic data channel or the auxiliary management channel is established.

In the embodiment of the present disclosure, the optical link auto-negotiation information is exchanged with the terminal device through the optical link auto-negotiation channel. Since the optical link auto-negotiation channel is independent of the traffic data channel and the auxiliary management channel, the link establishment for the traffic data channel is implemented by using the independent optical link auto-negotiation channel without increasing the complexity and cost of an optical module and without deteriorating the signal quality of the traffic data channel.

Figure 4:
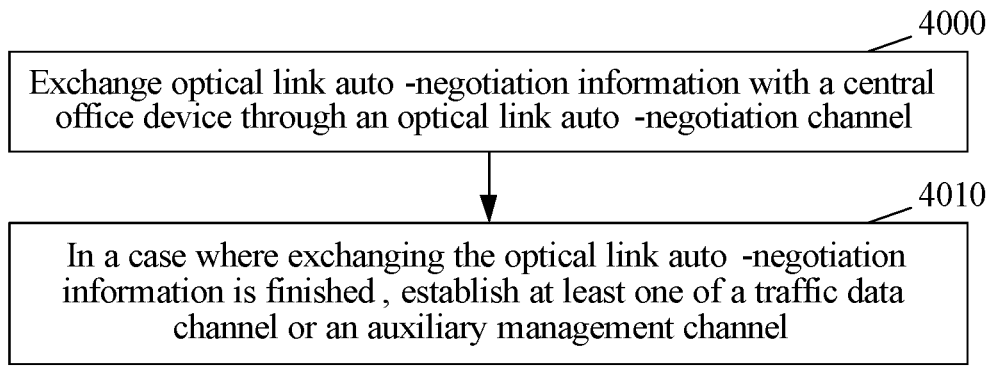
FIG. 4 is a flowchart of another link establishment method according to an embodiment of the present disclosure.

Referring to FIG. 4, another embodiment of the present disclosure provides a link establishment method applied to a terminal device and including steps 4000 and 4010.

In step 4000, optical link auto-negotiation information is exchanged with a central office device through an optical link auto-negotiation channel.

In the embodiment of the present disclosure, the optical link auto-negotiation channel is independent of a traffic data channel and an auxiliary management channel.

That is to say, at the same time, only one of the traffic data channel or the optical link auto-negotiation channel can transmit data on an optical link. For example, the optical link auto-negotiation information may be transmitted before the transmission of a traffic data channel message, after the traffic data channel message is interrupted due to a fault, or before the traffic data channel is restarted after its shutdown. A rate, frequency, coding mode, or the like of the optical link auto-negotiation information transmitted through the optical link auto-negotiation channel is independent of the traffic data channel. That is, the optical link auto-negotiation information transmitted through the optical link auto-negotiation channel may adopt a rate, coding mode, or the like that is the same as or different from that of traffic data.

When information about the auxiliary management channel needs to be transmitted, at the same time, only one of the optical link auto-negotiation channel or the auxiliary management channel transmits data on the optical link; and the rate, frequency, coding mode, or the like of the optical link auto-negotiation information transmitted through the optical link auto-negotiation channel is independent of the auxiliary management channel.

The auxiliary management channel is a WDM PON system management channel between the central office device and the terminal device in a WDM PON system, which operates at a different bandwidth from the traffic data channel when operating normally at the same time with the traffic data channel.

The auxiliary management channel is used for transmitting WDM PON system registration and authentication, OAM management messages, alarm reporting, performance statistics, link loopback, feedback information for the optical link auto-negotiation information, and the like.

In the embodiment of the present disclosure, the optical link auto-negotiation information includes at least one of information about an operating wavelength channel of the terminal device, an enabled or disabled state of forward error correction (FEC) between the central office device and the terminal device, an FEC type between the central office device and the terminal device, or an operating mode of the auxiliary management channel.

In another embodiment of the present disclosure, the optical link auto-negotiation information further includes at least one of a communication protocol, information about a rate of the optical link auto-negotiation channel, or traffic information carried in the traffic data channel.

The traffic information carried in the traffic data channel includes at least one of: a traffic type, rate information (information about a rate of the traffic data channel), a coding format, an FEC type (such as RS (528,514), RS (544,514), RS (255,223), and LDPC) between the central office device or the terminal device and a traffic device, an enabled or disabled state of FEC between the central office device or the terminal device and the traffic device, or the like.

In the embodiment of the present disclosure, the step in which the optical link auto-negotiation information is exchanged with the central office device through the optical link auto-negotiation channel includes steps described below.

The optical link auto-negotiation information is received and an operating parameter is adjusted according to the optical link auto-negotiation information. Feedback information is sent to the central office device and an exchange of the received optical link auto-negotiation information is finished. The preceding process is repeated until exchanges of all the optical link auto-negotiation information are finished.

The feedback information may be sent to the central office device through the optical link auto-negotiation channel or the auxiliary management channel.

The step of receiving the optical link auto-negotiation information includes a step described below.

An optical link auto-negotiation information frame is received, where the optical link auto-negotiation information frame includes one of: a preamble, at least one delimiting indicator, and at least one of a plurality of contents included in the optical link auto-negotiation information; or a start identifier, an end identifier, at least one delimiting indicator, and at least one of the plurality of contents included in the optical link auto-negotiation information.

The step of receiving the optical link auto-negotiation information includes any one of steps described below.

Information pulses interleaved with clock pulses are received, where the information pulses carry at least one of the plurality of contents included in the optical link auto-negotiation information.

The number of optical pulses is received and calculated, where the number of optical pulses is used for characterizing the information about the operating wavelength channel of the terminal device.

In the embodiment of the present disclosure, in a case where the received optical link auto-negotiation information does not include the rate of the traffic data channel, the rate of the traffic data channel may be determined according to the rate of the optical link auto-negotiation channel.

When the optical link auto-negotiation information is sent using a frame format as shown in FIG. 3, the information about the rate of the optical link auto-negotiation channel may be pre-agreed, or may be obtained during synchronization according to the preamble, or may be directly obtained from the optical link auto-negotiation information frame.

The rate of the traffic data channel may be determined in any one of manners described below.

The rate of the optical link auto-negotiation channel is determined to be the rate of the traffic data channel.

Information about an operating wavelength channel and a rate of the traffic data channel corresponding to the rate of the optical link auto-negotiation channel are determined according to a correspondence among the information about the operating wavelength channel, the rate of the optical link auto-negotiation channel, and the rate of the traffic data channel.

In step 4010, in a case where exchanging the optical link auto-negotiation information is finished, at least one of the traffic data channel or the auxiliary management channel is established.

In the embodiment of the present disclosure, the feedback information may be sent using the frame format as shown in FIG. 3.

Implementations of the embodiments of the present disclosure are illustrated by way of example, and examples given are not intended to limit the scope of the embodiments of the present disclosure.

Example One

Figure 5:
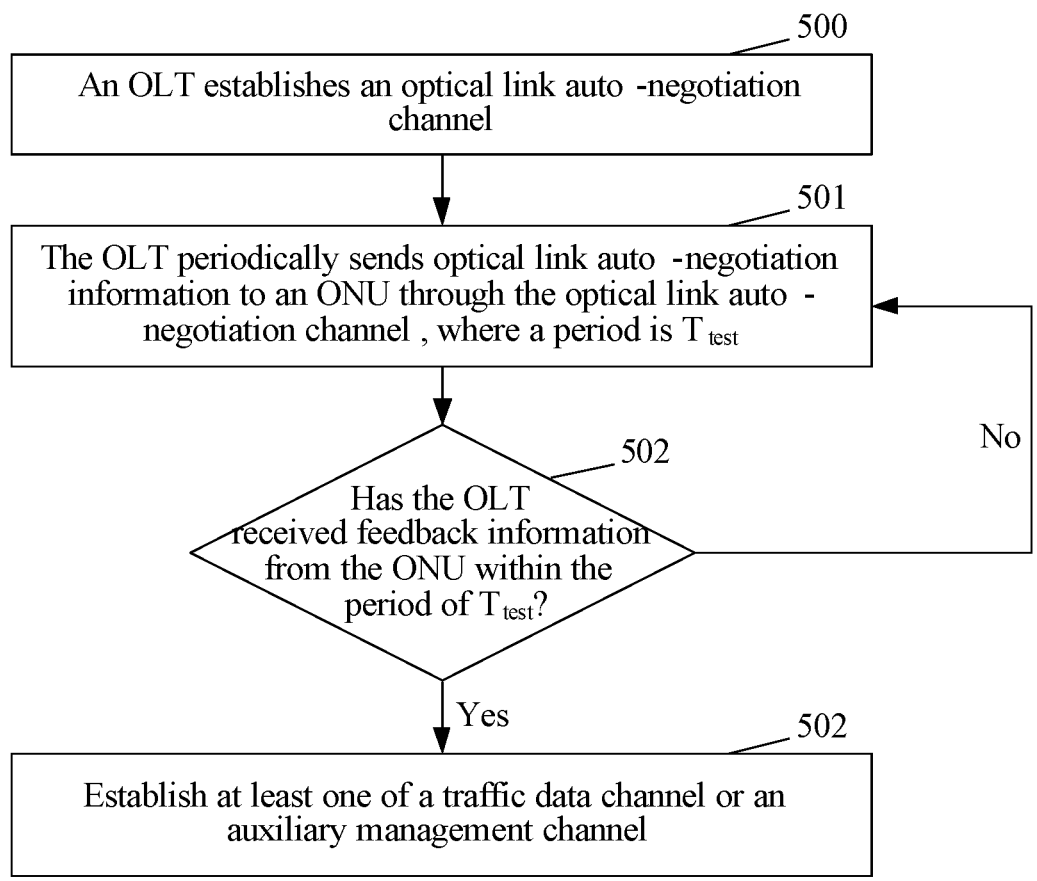
FIG. 5 is a flowchart of a link establishment method on an OLT side in example one of the present disclosure.

In this example, a WDM system includes a WDM PON OLT (the preceding central office device) and a WDM PON ONU (the preceding terminal device). The WDM PON ONU adopts a wavelength-tunable optical module. Referring to FIG. 5, an establishment process of a traffic data channel of the WDM PON OLT includes steps described below.

In step 500, the OLT establishes an optical link auto-negotiation channel.

In step 501, the OLT periodically sends optical link auto-negotiation information to the ONU through the optical link auto-negotiation channel, where a period is $T_{test}$.

In step 502, it is determined whether the OLT has received feedback information from the ONU within the period of $T_{test}$; when the OLT has received the feedback information from the ONU within the period of $T_{test}$, at least one of the traffic data channel or an auxiliary management channel is established. When the OLT has not received the feedback information from the ONU within the period of $T_{test}$, the OLT continues periodically sending the optical link auto-negotiation information to the ONU through the optical link auto-negotiation channel in a next period.

Figure 6:
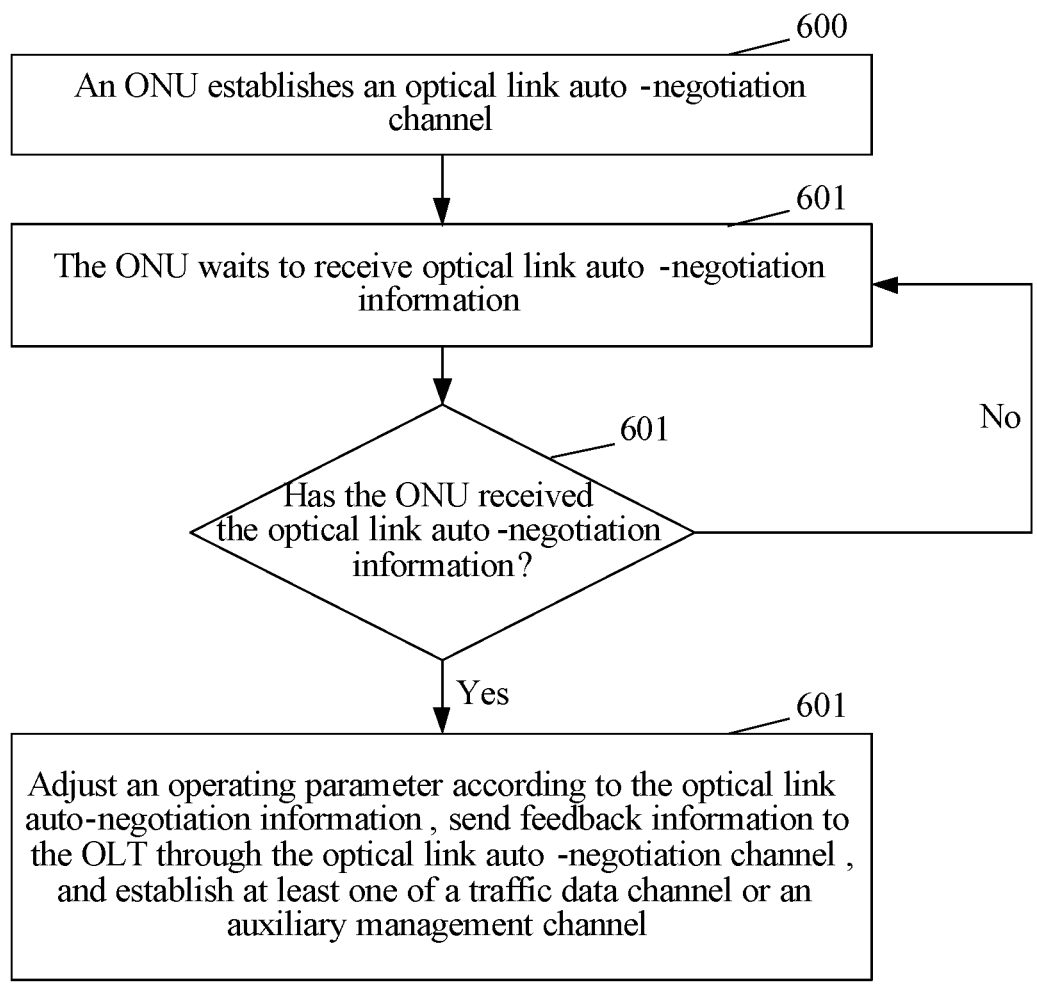
FIG. 6 is a flowchart of a link establishment method on an ONU side in example one of the present disclosure.

Referring to FIG. 6, an establishment process of a traffic data channel of the WDM PON ONU includes steps described below.

In step 600, the ONU establishes an optical link auto-negotiation channel.

In step 601, the ONU waits to receive optical link auto-negotiation information and when receiving the optical link auto-negotiation information, adjusts an operating parameter according to the optical link auto-negotiation information, sends feedback information to the OLT through the optical link auto-negotiation channel, and establishes at least one of the traffic data channel or an auxiliary management channel. When the optical link auto-negotiation information is not received, the ONU continues waiting to receive the optical link auto-negotiation information.

The optical link auto-negotiation channel has the same characteristics in this example as in the preceding embodiments, and the optical link auto-negotiation information is the same as that in the preceding embodiments. The details are not repeated here.

In this example, the optical link auto-negotiation information may be transmitted by using a signal with a frame format through the optical link auto-negotiation channel. The frame format may be the format shown in FIG. 3.

An optical link auto-negotiation information frame includes at least one of: information about an operating wavelength channel of the terminal device, an enabled or disabled state of FEC of a WDM PON itself (an enabled or disabled state of FEC between the OLT and the ONU), an FEC type of the WDM PON itself (an FEC type between the OLT and the ONU), or an operating mode of the auxiliary management channel.

The optical link auto-negotiation information frame may further include at least one of information about a rate of the optical link auto-negotiation channel, traffic information carried in the traffic data channel, or an FEC switch state between a traffic device and a PON device.

Figure 7:
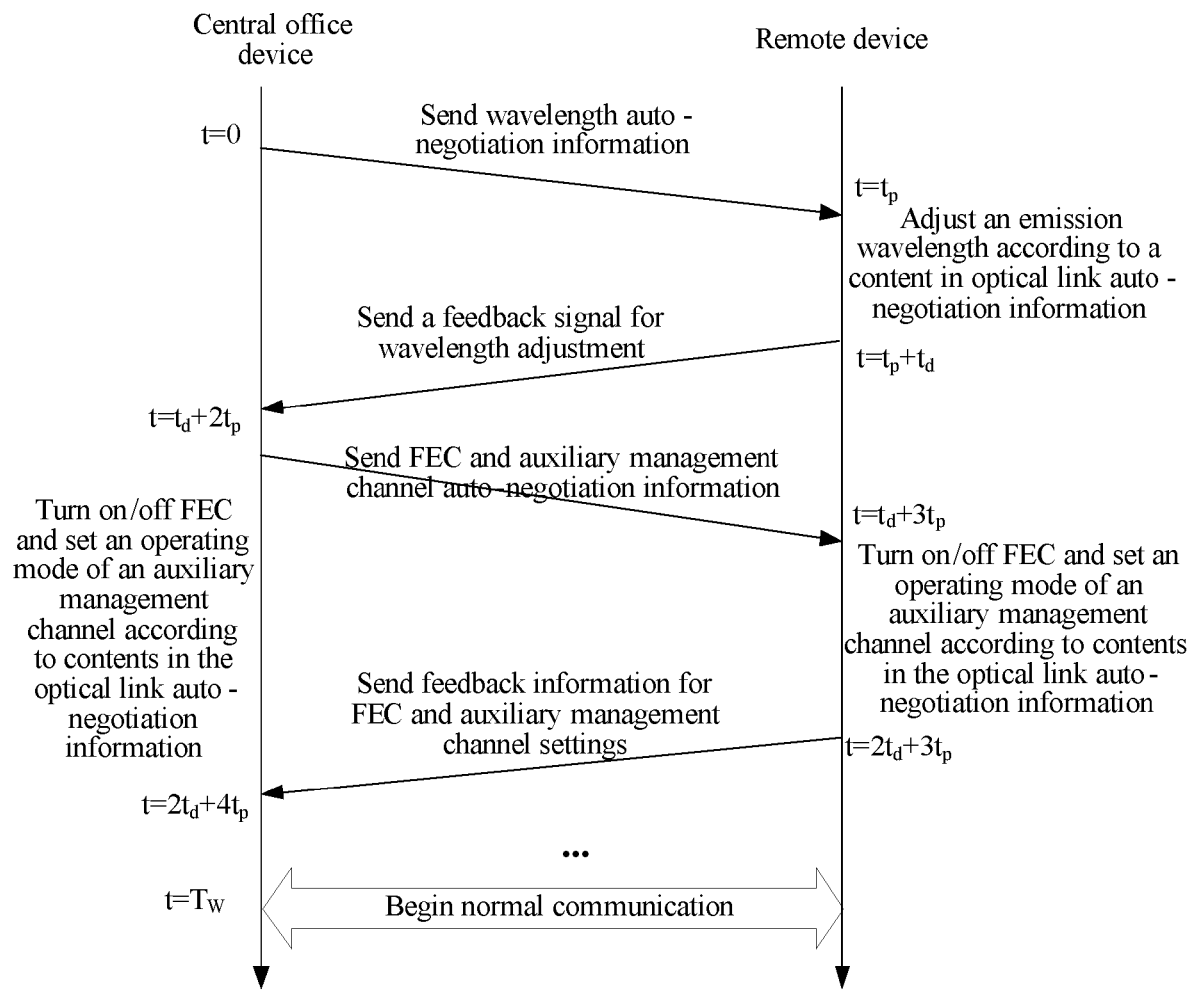
FIG. 7 is a flowchart of exchanges of optical link auto-negotiation information in example one of the present disclosure.

In this example, all the optical link auto-negotiation information to be exchanged may be sent in one period. Alternatively, a part of the optical link auto-negotiation information to be exchanged may be sent in one period, and after feedback information for this part of the optical link auto-negotiation information is received, another part of the optical link auto-negotiation information may be sent in a next period until exchanges of all the optical link auto-negotiation information are finished, as shown in FIG. 7.

In the preceding link establishment method, when the central office device and the terminal device do not need to negotiate the information about the operating wavelength channel of the terminal device (for example, when the WDM system is an external seeded optical system or a self-seeded optical system, a terminal optical module uses only a reflective modulator/reflective amplified modulator to send a signal instead of the tunable optical module), the wavelength auto-negotiation process in the above steps may not be performed.

Example Two

In this example, a link establishment method further includes detecting a connection state of a terminal device.

Figure 8:
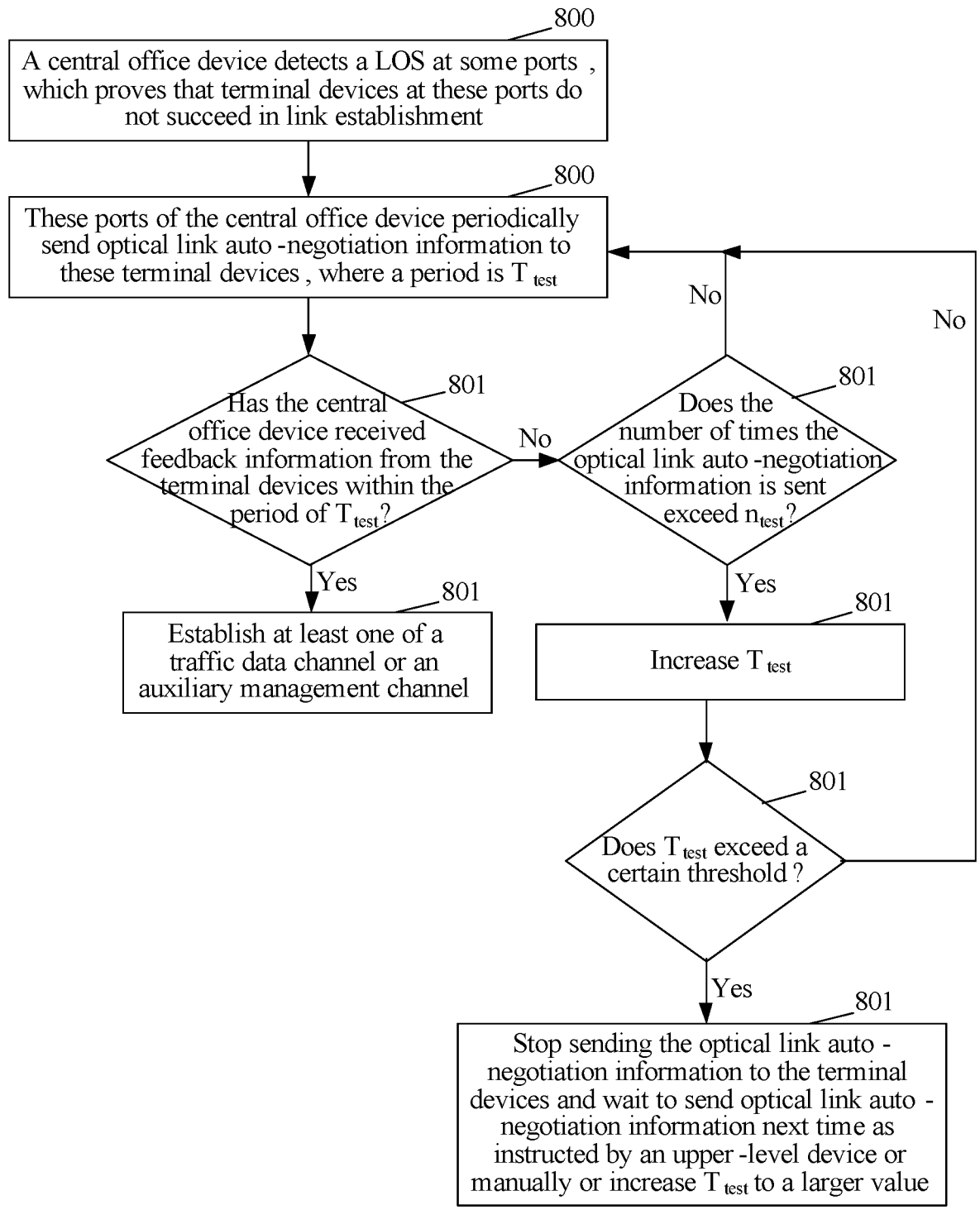
FIG. 8 is a flowchart of a link establishment method on an OLT side in example two of the present disclosure.

Referring to FIG. 8, an establishment process of a traffic data channel of a central office device includes steps described below.

In step 800, the central office device detects a loss of signal (LOS) at some ports, which proves that terminal devices at these ports do not succeed in link establishment. These ports of the central office device periodically send optical link auto-negotiation information to these terminal devices, where a period is $T_{test}$.

In step 801, it is determined whether the central office device has received feedback information from the terminal devices within the period of $T_{test}$; if the central office device has received the feedback information from the terminal devices within the period of $T_{test}$, at least one of the traffic data channel or an auxiliary management channel is established; if the central office device has not received the feedback information from the terminal devices within the period of $T_{test}$, the terminal devices may not be turned on, or the optical link auto-negotiation information has an error in the transmission process and is resent. It is determined whether the number of times the optical link auto-negotiation information is sent exceeds $n_{test}$. If the feedback information from the terminal devices is still not received when the number of times the optical link auto-negotiation information is sent exceeds $n_{test}$, for example, three times, it is considered that the terminal devices may not be turned on. In this case, $T_{test}$ is increased, for example, to 1 minute, and then the optical link auto-negotiation information is sent again. The preceding process is repeated. It is determined whether $T_{test}$ exceeds a certain threshold. If the feedback information from the terminal devices is still not received when $T_{test}$ increases to a certain threshold, for example, 10 minutes, the central office device stops sending the optical link auto-negotiation information to the terminal devices and considers that there is no terminal device connected at a port. Optical link auto-negotiation information is sent next time as instructed by an upper-level device or manually or $T_{test}$ is increased to a larger value such as one hour.

Example Three

When the negotiation of only a wavelength and a rate is involved between a central office device and a terminal device, optical link auto-negotiation information may not have a frame format, and wavelength control information multiplexed with rate information and rate information identification are used for performing the auto-negotiation of both a wavelength and a rate of the terminal device. This negotiation mechanism is implemented by a clock data recovery (CDR) chip of the terminal device. The central office device sends the optical link auto-negotiation information at different rates, each of which is an integer multiple of a reference clock for CDR (frequency value). The terminal device may identify a rate of an optical link auto-negotiation channel and adjust the wavelength and a rate of a traffic data channel according to a correspondence of the rate of the optical link auto-negotiation channel with the rate of the traffic data channel and information about an operating wavelength channel.

By using an example in which the reference clock for CDR is 25 MHz, a correspondence may be shown in Table 3. A wavelength channel number 1 corresponds to two rates of 20.2 Gbps and 10.1 Gbps of the optical link auto-negotiation channel, a wavelength channel number 2 corresponds to two rates of 20.3 Gbps and 10.15 Gbps of the optical link auto-negotiation channel, and so on. A wavelength channel 32 corresponds to two rates of 23.3 Gbps and 11.65 Gbps of the optical link auto-negotiation channel. When the rate of the optical link auto-negotiation channel is 20.2-23.3 Gbps, it indicates that an operating rate of the traffic data channel is 25 Gbps, and 10.1-11.65 Gbps indicates that the operating rate of the traffic data channel is 10 Gbps. That is, when the rate of the optical link auto-negotiation channel is 10.1 Gbps, it indicates that the traffic data channel operates on a wavelength channel 1 and at a rate of 10 Gbps. When the rate of the optical link auto-negotiation channel is 10.15 Gbps, it indicates that the traffic data channel operates on a wavelength channel 2 and at a rate of 10 Gbps. The same is done for the rest. When the rate of the optical link auto-negotiation channel is 11.65 Gbps, it indicates that the traffic data channel operates on a wavelength channel 32 and at a rate of 10 Gbps. When the rate of the optical link auto-negotiation channel is 20.2 Gbps, it indicates that the traffic data channel operates on the wavelength channel 1 and at a rate of 25 Gbps. When the rate of the optical link auto-negotiation channel is 20.3 Gbps, it indicates that the traffic data channel operates on the wavelength channel 2 and at a rate of 25 Gbps. The same is done for the rest. When the rate of the optical link auto-negotiation channel is 23.3 Gbps, it indicates that the traffic data channel operates on the wavelength channel 32 and at a rate of 25 Gbps. Similarly, normal operating rates of other WDM optical links may be represented by ¼ of the rate of the optical link auto-negotiation channel.

TABLE 3

| Wavelength Channel Number | Rate of the Optical Link Auto-negotiation Channel (Gbps) | Operating Rate of the Traffic Data Channel (Gbps) | Rate of the Optical Link Auto-negotiation Channel (Gbps) | Operating Rate of the Traffic Data Channel (Gbps) |
|---|---|---|---|---|
| 1 | 20.2 | 25 | 10.1 | 10 |
| 2 | 20.3 |  | 10.15 |  |
| 3 | 20.4 |  | 10.2 |  |
| 4 | 20.5 |  | 10.25 |  |
| 5 | 20.6 |  | 10.3 |  |
| 6 | 20.7 |  | 10.35 |  |
| 7 | 20.8 |  | 10.4 |  |
| 8 | 20.9 |  | 10.45 |  |
| 9 | 21 |  | 10.5 |  |
| 10 | 21.1 |  | 10.55 |  |
| ... | ... |  | ... |  |
| 32 | 23.3 |  | 11.65 |  |

Figure 9:
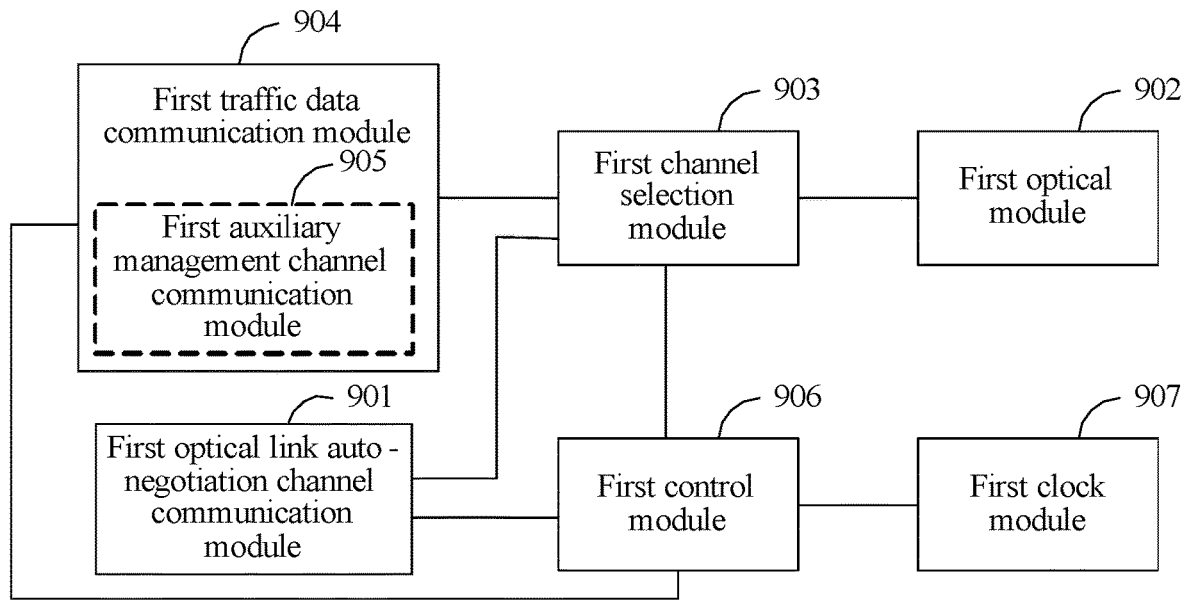
FIG. 9 is a structure diagram of a link establishment apparatus according to an embodiment of the present disclosure.

Referring to FIG. 9, another embodiment of the present disclosure provides a link establishment apparatus (for example, a central office device), which includes a first optical link auto-negotiation channel communication module 901 and a first optical module 902. The first optical link auto-negotiation channel communication module 901 and the first optical module 902 constitute an optical link auto-negotiation channel.

The first optical link auto-negotiation channel communication module 901 is configured to exchange optical link auto-negotiation information with a terminal device through the optical link auto-negotiation channel.

The optical link auto-negotiation channel is independent of a traffic data channel and an auxiliary management channel. The optical link auto-negotiation information includes at least one of information about an operating wavelength channel of the terminal device, an enabled or disabled state of FEC between the central office device and the terminal device, an FEC type between the central office device and the terminal device, or an operating mode of the auxiliary management channel.

In the embodiment of the present disclosure, features related to the optical link auto-negotiation channel, the traffic data channel, and the auxiliary management channel are the same as those in the preceding embodiments. The details are not repeated here.

In an embodiment of the present disclosure, the first optical link auto-negotiation channel communication module 901 is configured to perform operations described below.

At least one of a plurality of contents included in the optical link auto-negotiation information is sent to the terminal device through the optical link auto-negotiation channel. In a case of the first optical link auto-negotiation channel communication module 901 or a first auxiliary management channel communication module 905 receiving feedback information from the terminal device, an exchange of sent optical link auto-negotiation information is finished. The preceding process is repeated until exchanges of all the optical link auto-negotiation information are finished.

In an embodiment of the present disclosure, the first optical link auto-negotiation channel communication module 901 is configured to send the optical link auto-negotiation information in one of manners described below.

Optical link auto-negotiation channel information is sent to a transmit signal pin (such as a TD+/TD– or RD+/RD– pin) of a first transmitter of the first optical module.

The first transmitter of the first optical module is adjusted, according to the optical link auto-negotiation information, to change between a light state and a non-light state to send an optical pulse.

The first optical link auto-negotiation channel communication module 901 is configured to receive the feedback information in one of manners described below.

The feedback information is received from a receive signal pin of a first receiver of the first optical module.

The feedback information is obtained through an optical pulse or the number of optical pulses (a LOS alarm count) that is formed by a change between the light state and the non-light state and received by the first receiver of the first optical module.

In an embodiment of the present disclosure, the first optical link auto-negotiation channel communication module 901 is configured to send the optical pulse in any one of manners described below.

A magnitude of a bias current of the first transmitter of the first optical module is adjusted.

A magnitude of a bias voltage of the first transmitter of the first optical module is adjusted.

A first optical switch of the first optical module is controlled to turn on and off.

A first semiconductor optical amplifier (SOA) of the first optical module is controlled to turn on and off.

A first adjustable optical attenuator (VOA) of the first optical module is controlled to turn on and off.

In another embodiment of the present disclosure, in a case where the first optical link auto-negotiation channel communication module sends the optical link auto-negotiation information by sending the optical link auto-negotiation channel information to the transmit signal pin of the first transmitter of the first optical module and receives the feedback information by receiving the feedback information from the receive signal pin of the first receiver of the first optical module, the link establishment apparatus further includes a first channel selection module 903 and a first traffic data communication module 904.

The first channel selection module 903 is connected to the first optical link auto-negotiation channel communication module 901, the first optical module 902, and the first traffic data communication module 904, separately.

The first channel selection module 903 is configured to select one of the first optical link auto-negotiation channel communication module 901 or the first traffic data communication module 904, which is to be connected to the first optical module 902. In an embodiment, the first optical link auto-negotiation channel communication module 901 is selected to be connected to the first optical module 902 to establish the optical link auto-negotiation channel. When the first optical link auto-negotiation channel communication module 901 finishes exchanging the optical link auto-negotiation information with the terminal device through the optical link auto-negotiation channel, the first traffic data communication module 904 is selected to be connected to the first optical module 902 to establish the traffic data channel.

The first traffic data communication module 904 is configured to send traffic data to the terminal device and receive traffic data sent by the terminal device.

In the embodiment of the present disclosure, when the first channel selection module 903 selects the first optical link auto-negotiation channel communication module 901 to be connected to the first optical module 902, the first optical link auto-negotiation channel communication module 901, the first channel selection module 903, and the first optical module 902 constitute the optical link auto-negotiation channel. When the first channel selection module 903 selects the first traffic data communication module 904 to be connected to the first optical module 902, the first traffic data communication module 904, the first channel selection module 903, and the first optical module 902 constitute the traffic data channel. When the optical link auto-negotiation channel operates, the first traffic data communication module 904 and the first optical module 902 are in an unconnected state, the traffic data channel or the auxiliary management channel cannot send/receive data to/from a WDM optical link through the optical module, and only the optical link auto-negotiation information is transmitted on the WDM optical link. A rate/frequency, coding mode, or the like of an optical link auto-negotiation channel signal is independent of the traffic data channel and the auxiliary management channel. The embodiments of the present disclosure implement the optical link auto-negotiation channel independent of the traffic data channel through the first channel selection module 903.

In the embodiment of the present disclosure, in a case where the first optical link auto-negotiation channel communication module 901 sends the optical link auto-negotiation information by adjusting the first transmitter of the first optical module to change between the light state and the non-light state to send the optical pulse and obtains the feedback information through the optical pulse or the number of optical pulses that is formed by the change between the light state and the non-light state and received by the first receiver of the first optical module, the first optical link auto-negotiation channel communication module 901 is connected to the first optical module 902 through an Inter-Integrated Circuit interface.

The first optical link auto-negotiation channel communication module 901 performs a read operation or a write operation on a register of the first optical module 902 through the Inter-Integrated Circuit interface to exchange the optical link auto-negotiation information with the terminal device.

An implementation process is described in example four. The details are not repeated here.

In the embodiment of the present disclosure, the link establishment apparatus further includes the first auxiliary management channel communication module 905.

The first auxiliary management channel communication module 905 is built in the first traffic data communication module 904 or connected in series between the first traffic data communication module 904 and the first channel selection module 903 and is configured to send auxiliary management channel data to the terminal device and receive auxiliary management channel data sent by the terminal device.

In the embodiment of the present disclosure, the first auxiliary management channel communication module 905 may be integrated with the first traffic data communication module 904 on the same chip or may be connected in series as an independent chip on a traffic data transmission link formed between the first traffic data communication module 904 and the first channel selection module 903. When the first auxiliary management channel communication module 905 is connected in series as the independent chip on the traffic data transmission link formed between the first traffic data communication module 904 and the first channel selection module 903, the first auxiliary management channel communication module 905 may also be built in the first optical module 902.

The traffic data and the auxiliary management channel data may be transmitted simultaneously in a WDM system.

In another embodiment of the present disclosure, the link establishment apparatus further includes a first control module 906.

The first control module 906 is connected to the first optical link auto-negotiation channel communication module 901 and configured to control the first optical link auto-negotiation channel communication module 901 to exchange the optical link auto-negotiation information with the terminal device through the optical link auto-negotiation channel.

In another embodiment of the present disclosure, in a case where the first optical link auto-negotiation channel communication module is built in the first optical module, at least one of the first channel selection module, the first control module, or a first clock module is built in the first optical module.

In a case where the first optical link auto-negotiation channel communication module is built in the first optical module and the first optical link auto-negotiation channel communication module sends the optical link auto-negotiation information by adjusting the transmitter of the first optical module to change between the light state and the non-light state to send the optical pulse and obtains the feedback information through the optical pulse or the number of optical pulses that is formed by the change between the light state and the non-light state and received by the first receiver of the first optical module, the optical link auto-negotiation channel communication module and connections between the optical link auto-negotiation channel communication module and the first transmitter and the first receiver of the first optical module are implemented by internal circuits of the first optical module.

In another embodiment of the present disclosure, the link establishment apparatus further includes the first control module 906.

The first control module 906 is connected to the first channel selection module 903 and configured to control the first channel selection module 903 to select one of the first optical link auto-negotiation channel communication module 901 or the first traffic data communication module 904, which is to be connected to the first optical module 902.

In the embodiment of the present disclosure, the first optical module 902 is configured to convert the optical link auto-negotiation information outputted from the first channel selection module 903 into an optical signal and transmit the optical signal to the WDM optical link or to convert an optical signal inputted from the WDM optical link into an electrical signal and transmit the electrical signal to the first channel selection module 903.

The central office device may include at least one first optical module 902. The first optical module may be a wavelength-fixed optical module or a wavelength-tunable optical module.

In the embodiment of the present disclosure, the first optical link auto-negotiation channel communication module 901, the first optical module 902, the first channel selection module 903, the first control module 906, the first clock module 907, the first traffic data communication module 904, and the first auxiliary management channel communication module 905 may be implemented by at least one chip. The preceding modules may be implemented on one chip or multiple chips in any combination manner.

For example, the first optical link auto-negotiation channel communication module 901 may be implemented in any one of manners described below.

Manner one: the first optical link auto-negotiation channel communication module 901 may be implemented by a separate field-programmable gate array (FPGA) chip and sends the optical link auto-negotiation information subjected to processing such as coding, framing, FEC coding, and parallel-to-serial conversion.

Manner two: the first optical link auto-negotiation channel communication module 901 may be integrated with a physical layer (PHY) function chip or a media access control (MAC) function chip of the first traffic data communication module 904 into an application-specific integrated circuit (ASIC) chip and be connected to the first channel selection module 903 through two independent high-speed serial-to-parallel conversion (Serializer/Deserializer (SerDes)) interfaces.

Manner three: the first optical link auto-negotiation channel communication module 901 may be integrated with the first control module 906 in a central processing unit (CPU) and be connected to the first channel selection module 903 through an independent Inter-Integrated Circuit (I²C) interface.

For example, the first channel selection module 903 may be implemented in any one of manners described below.

Manner one: the first channel selection module 903 implements channel selection between the optical link auto-negotiation channel and the traffic data channel or the auxiliary management channel by using a separate clock reconstruction (Retimer) chip, such as a Cross point switch function of DS280DF810 chip.

Figure 10:
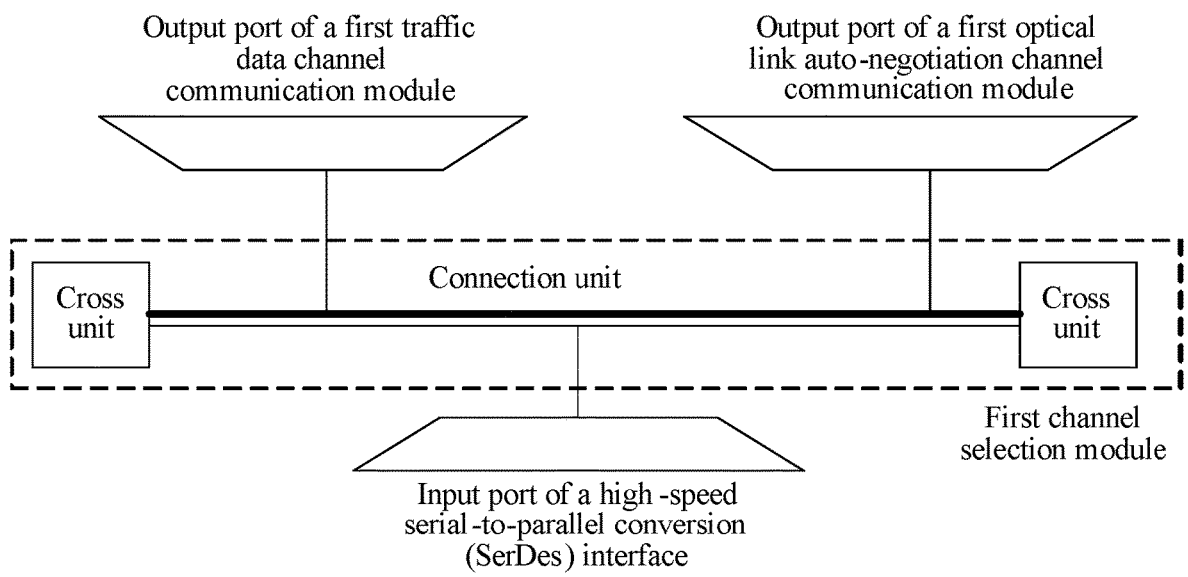
FIG. 10 is a schematic diagram of a first channel selection module according to an embodiment of the present disclosure.

Manner two: the first channel selection module 903 is integrated with the first optical link auto-negotiation channel communication module 901 or the first traffic data communication module 904 into an FPGA chip. A high-speed parallel processing customized dedicated interface is used between the first channel selection module 903 and the first optical link auto-negotiation channel communication module 901 or the first traffic data communication module 904 and a SerDes interface is used between the first channel selection module 903 and the first optical module 902. A channel selection function of the first channel selection module 903 is implemented by a connection unit and a cross switch in the FPGA chip, as shown in FIG. 10.

As another example, the first optical module 902 includes an optical transmitter (a fixed wavelength or a tunable wavelength), an optical receiver (a fixed wavelength or a tunable wavelength), a multiplexer/demultiplexer, a laser diode driver (LDD), a transimpedance amplifier (TIA), a limiting amplifier (LA), a microcontroller unit (MCU), CDR, and other devices. The first optical module 902 is connected to the first channel selection module 903 through differential data lines TD+/TD− and RD+/RD− and converts the optical link auto-negotiation information or traffic data information into an optical signal and transmits the optical signal to the terminal device through the WDM optical link.

As another example, the first control module 906 may be implemented by a CPU, an MCU, a complex programmable logic device (CPLD), or the like and is connected to the first traffic data communication module 904 (or the first auxiliary management channel communication module 905), the first optical link auto-negotiation channel communication module 901, the first channel selection module 903, and the first optical module 902 through control lines such as I²C to transmit a plurality of module control messages and control feedback messages.

In the embodiment of the present disclosure, the link establishment apparatus further includes the first clock module 907.

The first clock module 907 is configured to provide a reference clock source for an operation of another function module.

The other function module includes at least one of: the first optical link auto-negotiation channel communication module 901, the first optical module 902, the first channel selection module 903, the first traffic data communication module 904, the first auxiliary management channel communication module 905, or the first control module 906.

In an embodiment of the present disclosure, data information as well as clock information is transferred through information transfer interfaces between multiple function modules.

In an embodiment of the present disclosure, the WDM optical link includes a wavelength-division multiplexing/demultiplexing device, an optical fiber, a beam splitter, and the like and is configured to connect multiple first optical modules of the central office device to tunable optical modules of multiple terminal devices.

In an embodiment of the present disclosure, the first optical module may include one or more groups of optical transmitters and optical receivers. When the first optical module includes multiple groups of optical transmitters and receivers, auto-negotiation channel information may be loaded through one or more of the multiple groups of optical transmitters and receivers.

In an embodiment of the present disclosure, the first optical link auto-negotiation channel communication module 901, the first channel selection module 903 (the optical link auto-negotiation channel is in a connected state), the first optical module 902 of the central office device, a second optical link auto-negotiation channel communication module 1101, a second channel selection module 1103 (the optical link auto-negotiation channel is in the connected state), a second optical module 1102 of the terminal device, and the WDM optical link constitute the optical link auto-negotiation channel.

Figure 11:
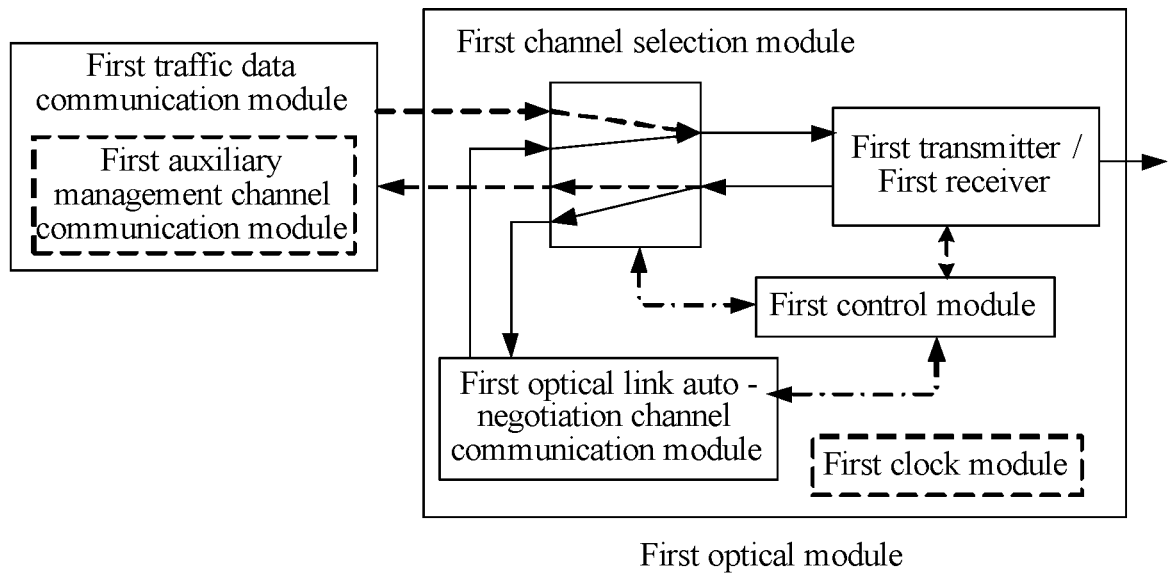
FIG. 11 is a structure diagram of a first optical module according to an embodiment of the present disclosure.

In the embodiment of the present disclosure, the first optical link auto-negotiation channel communication module, the first channel selection module, the first control module, and the first clock module may also be built in the first optical module. Functions of the first optical link auto-negotiation channel communication module and the first control module may be implemented by a microprogrammed control unit (MCU) of the first optical module. The first channel selection module may be implemented by CDR of the first optical module. The first clock module may also use a clock module of the first optical module or recover from traffic data through a CDR chip. In this case, the function unit of the central office device that constitutes the optical link auto-negotiation channel and participates in auto-negotiation is the first optical module, as shown in FIG. 11.

Before the central office device and the terminal device establish the traffic data channel or the auxiliary management channel, the connected state of the optical link auto-negotiation channel is implemented through the first channel selection module 903 and the second channel selection module 1103 so that the optical link auto-negotiation channel is established. When the optical link auto-negotiation channel operates, the first traffic data communication module 904, the first auxiliary management channel communication module 905, and the first optical module 902 (the optical transmitter and the optical receiver) are in the unconnected state, a second traffic data communication module 1104, a second auxiliary management channel communication module 1105, and the second optical module 1102 (an optical transmitter and an optical receiver) are in the unconnected state, the first traffic data communication module 904 or the first auxiliary management channel communication module 905 cannot send data to the WDM optical link through the first optical module 902, the second traffic data communication module 1104 or the second auxiliary management channel communication module 1105 cannot receive data from the WDM optical link through the second optical module 1102, and only the optical link auto-negotiation information is transmitted on the WDM optical link. The rate, frequency, coding mode, or the like of the optical link auto-negotiation information is independent of the traffic data channel and the auxiliary management channel. That is, at the same time, the optical link auto-negotiation channel and electrical signaling and processing links other than the optical link included in the traffic data channel are independent of each other.

After the central office device finishes exchanging the optical link auto-negotiation information with the terminal device, the connected state of the traffic data channel is implemented through the first channel selection module 903 and the second channel selection module so that the traffic data channel is established and enabled.

In the embodiments of the present disclosure, no additional pilot tone modulation signal needs to be introduced so that the complexity and cost of the optical module will not be increased. Moreover, the independence from an optical link for traffic data will neither deteriorate the signal quality of the optical link for traffic data nor introduce an optical power cost.

Figure 12:
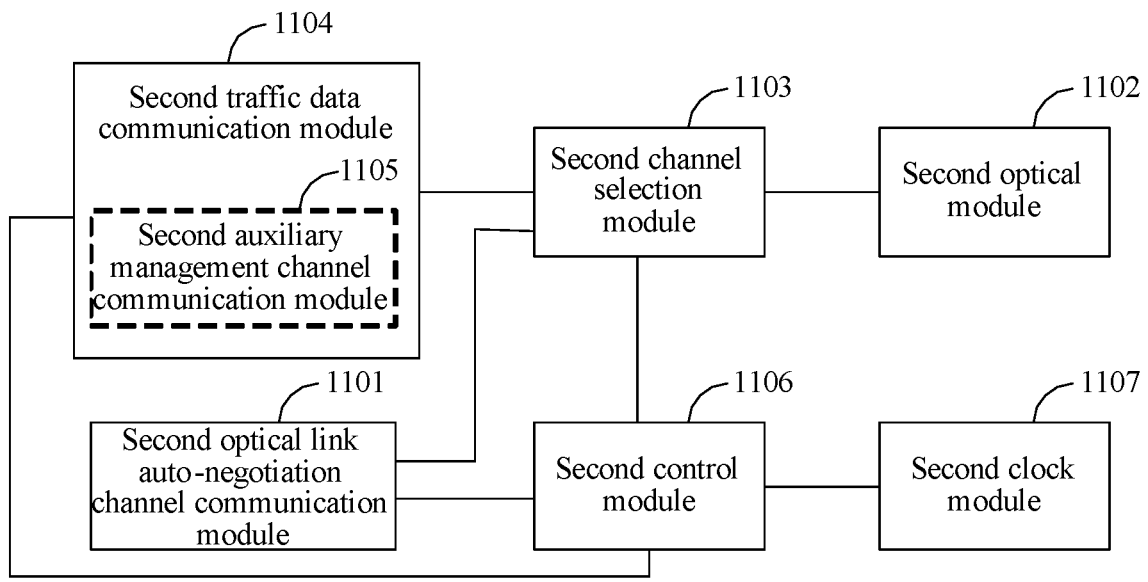
FIG. 12 is a structure diagram of a link establishment apparatus according to another embodiment of the present disclosure.

Referring to FIG. 12, another embodiment of the present disclosure provides a link establishment apparatus (for example, a terminal device), which includes a second optical link auto-negotiation channel communication module 1101 and a second optical module 1102. The second optical link auto-negotiation channel communication module 1101 and the second optical module 1102 constitute an optical link auto-negotiation channel.

The second optical link auto-negotiation channel communication module 1101 is configured to exchange optical link auto-negotiation information with a central office device through the optical link auto-negotiation channel.

The optical link auto-negotiation channel is independent of a traffic data channel and an auxiliary management channel. The optical link auto-negotiation information includes at least one of information about an operating wavelength channel of the terminal device, an enabled or disabled state of FEC between the central office device and the terminal device, an FEC type between the central office device and the terminal device, or an operating mode of the auxiliary management channel.

In the embodiment of the present disclosure, features related to the optical link auto-negotiation channel, the traffic data channel, and the auxiliary management channel are the same as those in the preceding embodiments. The details are not repeated here.

In the preceding embodiments of the present disclosure, the first optical link auto-negotiation channel communication module 901 and the first optical module 902 of the central office device, the WDM optical link, and the second optical module 1102 and the second optical link auto-negotiation channel communication module 1101 of the terminal device constitute the optical link auto-negotiation channel.

In the embodiment of the present disclosure, the second optical link auto-negotiation channel communication module 1101 is configured to perform operations described below.

The optical link auto-negotiation information is received and an operating parameter is adjusted according to the optical link auto-negotiation information. The second optical link auto-negotiation channel communication module 1101 sends feedback information to the central office device through the optical link auto-negotiation channel or a second auxiliary management channel communication module 1105 sends feedback information to the central office device through the auxiliary management channel, and an exchange of the received optical link auto-negotiation information is finished. The preceding process is repeated until exchanges of all the optical link auto-negotiation information are finished.

The second optical link auto-negotiation channel communication module 1101 generates an operating parameter adjustment instruction according to the optical link auto-negotiation information and sends the operating parameter adjustment instruction to the second optical module 1102 or the second auxiliary management channel communication module 1105 when adjusting the operating parameter according to the optical link auto-negotiation information.

In an embodiment of the present disclosure, the second optical link auto-negotiation channel communication module 1101 is configured to receive the optical link auto-negotiation information in one of manners described below.

Optical link auto-negotiation channel information is received from a receive signal pin of a second receiver of the second optical module 1102.

The optical link auto-negotiation channel information is obtained through an optical pulse or the number of optical pulses (a LOS alarm count) that is formed by a change between a light state and a non-light state and received by the second receiver of the second optical module.

The second optical link auto-negotiation channel communication module 1101 is configured to send the feedback information in any one of manners described below.

The optical link auto-negotiation channel information is sent to a transmit signal pin (such as a TD+/TD− or RD+/RD− pin) of a second transmitter of the second optical module 1102.

The second transmitter of the second optical module is adjusted, according to the feedback information, to change between the light state and the non-light state to send an optical pulse.

In an embodiment of the present disclosure, the second optical link auto-negotiation channel communication module 1101 is configured to send the optical pulse in any one of manners described below.

A magnitude of a bias current of the second transmitter of the second optical module 1102 is adjusted.

A magnitude of a bias voltage of the second transmitter of the second optical module 1102 is adjusted.

A second optical switch of the second optical module 1102 is controlled to turn on and off.

A second SOA of the second optical module 1102 is controlled to turn on and off.

A second VOA of the second optical module 1102 is controlled to turn on and off.

In another embodiment of the present disclosure, in a case where the second optical link auto-negotiation channel communication module 1101 receives the optical link auto-negotiation information by receiving the optical link auto-negotiation channel information from the receive signal pin of the second receiver of the second optical module 1102 and sends the feedback information by sending the optical link auto-negotiation channel information to the transmit signal pin of the second transmitter of the second optical module, the link establishment apparatus further includes a second channel selection module 1103 and a second traffic data communication module 1104.

The second channel selection module 1103 is connected to the second optical link auto-negotiation channel communication module 1101, the second optical module 1102, and the second traffic data communication module 1104, separately.

The second channel selection module 1103 is configured to select one of the second optical link auto-negotiation channel communication module 1101 or the second traffic data communication module 1104, which is to be connected to the second optical module 1102. In an embodiment, the second optical link auto-negotiation channel communication module 1101 is selected to be connected to the second optical module 1102 to establish the optical link auto-negotiation channel. When the second optical link auto-negotiation channel communication module 1101 finishes exchanging the optical link auto-negotiation information with the central office device through the optical link auto-negotiation channel, the second traffic data communication module 1104 is selected to be connected to the second optical module 1102 to establish the traffic data channel.

The second traffic data communication module 1104 is configured to send traffic data to the central office device and receive traffic data sent by the central office device.

In an embodiment of the present disclosure, in a case where the second optical link auto-negotiation channel communication module 1101 obtains the optical link auto-negotiation channel information through the optical pulse or the number of optical pulses that is formed by the change between the light state and the non-light state and received by the second receiver of the second optical module 1101 and adjusts, according to the feedback information, the second transmitter of the second optical module to change between the light state and the non-light state to send the optical pulse, the second optical link auto-negotiation channel communication module 1101 is connected to the second optical module 1102 through an Inter-Integrated Circuit interface.

The second optical link auto-negotiation channel communication module 1101 performs a read operation or a write operation on a register of the second optical module 1102 through the Inter-Integrated Circuit interface to exchange the optical link auto-negotiation information with the central office device.

An implementation process is described in example four. The details are not repeated here.

In the embodiment of the present disclosure, when the second channel selection module 1103 selects the second optical link auto-negotiation channel communication module 1101 to be connected to the second optical module 1102, the second optical link auto-negotiation channel communication module 1101, the second channel selection module 1103, and the second optical module 1102 constitute the optical link auto-negotiation channel. When the second channel selection module 1103 selects the second traffic data communication module 1104 to be connected to the second optical module 1102, the second traffic data communication module 1104, the second channel selection module 1103, and the second optical module 1102 constitute the traffic data channel. The embodiments of the present disclosure implement the optical link auto-negotiation channel independent of the traffic data channel through the second channel selection module 1103.

In the embodiment of the present disclosure, the link establishment apparatus further includes the second auxiliary management channel communication module 1105.

The second auxiliary management channel communication module 1105 is built in the second traffic data communication module 1104 or connected in series between the second traffic data communication module 1104 and the second channel selection module 1103 and is configured to send auxiliary management channel data to the central office device and receive auxiliary management channel data sent by the central office device.

In the embodiment of the present disclosure, the second auxiliary management channel communication module 1105 may be integrated with the second traffic data communication module 1104 on the same chip or may be connected in series as an independent chip on a traffic data transmission link formed between the second traffic data communication module 1104 and the second channel selection module 1103. When the second auxiliary management channel communication module 1105 is connected in series as the independent chip on the traffic data transmission link formed between the second traffic data communication module 1104 and the second channel selection module 1103, the second auxiliary management channel communication module 1105 may also be built in the second optical module 1102.

The traffic data and the auxiliary management channel data may be transmitted simultaneously in a WDM system.

In another embodiment of the present disclosure, the link establishment apparatus further includes a second control module 1106.

The second control module 1106 is connected to the second optical link auto-negotiation channel communication module 1101 and the second traffic data communication module 1104. The second optical link auto-negotiation channel communication module 1101 is further configured to perform an operation described below.

The received optical link auto-negotiation information is sent to the second control module 1106.

The second control module 1106 is further configured to perform operations described below.

The optical link auto-negotiation information is received, an operating parameter of a second traffic data module is adjusted according to the optical link auto-negotiation information, and the feedback information is sent to the second optical link auto-negotiation channel communication module.

In another embodiment of the present disclosure, the link establishment apparatus further includes the second control module 1106.

The second control module 1106 is connected to the second channel selection module 1103 and configured to control the second channel selection module 1103 to select one of the second optical link auto-negotiation channel communication module 1101 or the second traffic data communication module 1104, which is to be connected to the second optical module 1102.

In the embodiment of the present disclosure, in a case where the second optical link auto-negotiation channel communication module is built in the second optical module, at least one of the second channel selection module, the second control module, or a second clock module is built in the second optical module.

In a case where the second optical link auto-negotiation channel communication module is built in the second optical module and the second optical link auto-negotiation channel communication module obtains the optical link auto-negotiation channel information through the optical pulse or the number of optical pulses that is formed by the change between the light state and the non-light state and received by the second receiver of the second optical module and adjusts, according to the feedback information, the second transmitter of the second optical module to change between the light state and the non-light state to send the optical pulse, the second optical link auto-negotiation channel communication module is connected to the second transmitter and the second receiver of the second optical module by internal circuits of the second optical module.

In the embodiment of the present disclosure, the second optical module 1102 is configured to convert the optical link auto-negotiation information outputted from the second channel selection module 1103 into an optical signal and transmit the optical signal to the WDM optical link or to convert an optical signal inputted from the WDM optical link into an electrical signal and transmit the electrical signal to the second channel selection module 1103.

The terminal device may include at least one second optical module 1102. The second optical module 1102 may be a wavelength-fixed optical module or a wavelength-tunable optical module.

A traffic data sending/receiving module is connected to a channel selection module and configured to send traffic data to the central office device and receive traffic data sent by the central office device.

The traffic data and the auxiliary management channel data may be transmitted simultaneously in the WDM system.

In an embodiment of the present disclosure, the second optical link auto-negotiation channel communication module 1101 is implemented in any one of manners described below.

Manner one: the second optical link auto-negotiation channel communication module 1101 may be implemented by a separate FPGA chip and obtains the optical link auto-negotiation information subjected to processing such as synchronization, decoding, frame parsing, FEC decoding, and serial-to-parallel conversion.

Manner two: the second optical link auto-negotiation channel communication module 1101 may be integrated with a PHY function chip or a MAC function chip of the second traffic data communication module into an ASIC chip and be connected to the second channel selection module 1103 through two independent SerDes interfaces.

Manner three: the second optical link auto-negotiation channel communication module 1101 may be integrated with the second control module 1106 in a CPU and be connected to the second channel selection module 1103 through an independent I$^2$C interface.

In an embodiment of the present disclosure, the second channel selection module 1103 may be implemented in any one of manners described below.

Manner one: the second channel selection module 1103 implements channel selection between the optical link auto-negotiation channel and the traffic data channel or the auxiliary management channel by using a separate Retimer chip, such as a Cross point switch function of DS280DF810 chip.

Figure 13:
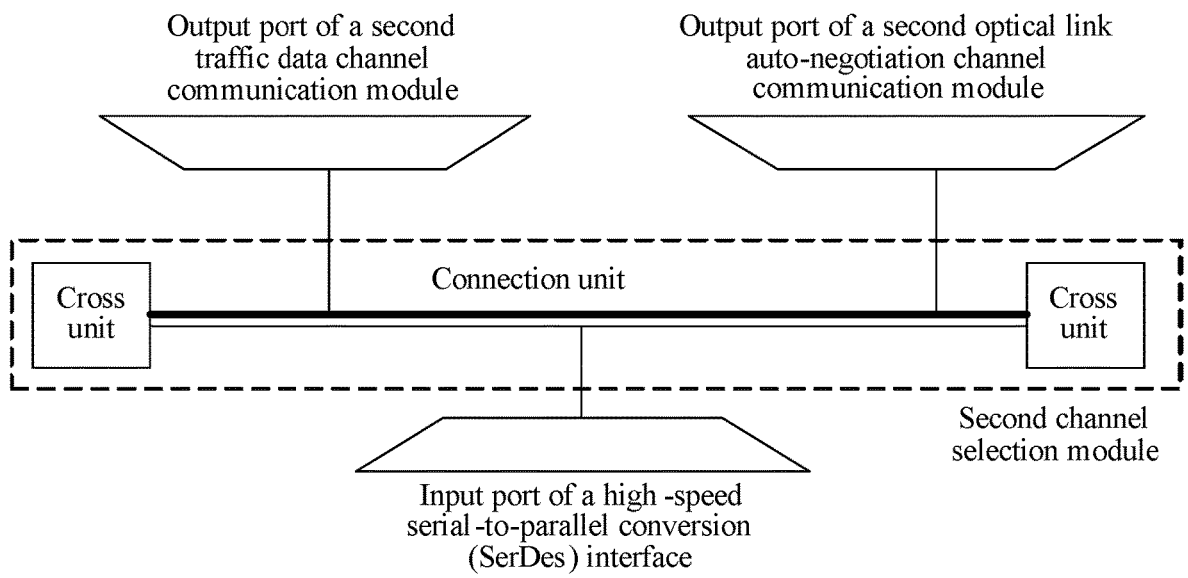
FIG. 13 is a schematic diagram of a second channel selection module according to an embodiment of the present disclosure.

Manner two: the second channel selection module 1103 is integrated with the second optical link auto-negotiation channel communication module 1101 or the second traffic data communication module 1104 into an FPGA chip. A high-speed parallel processing customized dedicated interface is used between the second channel selection module 1103 and the second optical link auto-negotiation channel communication module 1101 or the second traffic data communication module 1104 and a SerDes interface is used between the second channel selection module 1103 and the second optical module 1102. A channel selection function of the second channel selection module 1103 is implemented by a connection unit and a cross switch in the FPGA chip, as shown in FIG. 13.

In the embodiment of the present disclosure, the second optical module 1102 includes an optical transmitter (a fixed wavelength or a tunable wavelength), an optical receiver (a fixed wavelength or a tunable wavelength), a multiplexer/demultiplexer, an LDD, a TIA, an LA, a microcontroller unit (MCU), CDR, and other devices. The second optical module 1102 is connected to the second channel selection module 1103 through differential data lines TD+/TD− and RD+/RD− and converts the optical link auto-negotiation information or traffic data information into an optical signal and transmits the optical signal to the central office device through the WDM optical link.

In the embodiment of the present disclosure, the second control module 1106 may be implemented by a CPU, an MCU, a complex programmable logic device (CPLD), or the like and is connected to the second traffic data communication module 1104 (or the second auxiliary management channel communication module 1105), the second optical link auto-negotiation channel communication module 1101, the second channel selection module 1103, and the second optical module through control lines such as I$^2$C to transmit a plurality of module control messages and control feedback messages.

In the embodiment of the present disclosure, the link establishment apparatus further includes a second clock module 1107.

The second clock module 1107 is configured to provide a reference clock source for an operation of another function module.

The other function module includes at least one of: the second optical link auto-negotiation channel communication module 1101, the second optical module 1102, the second channel selection module 1103, the second traffic data communication module 1104, the second auxiliary management channel communication module 1105, or the second control module 1106.

In the embodiment of the present disclosure, data information as well as clock information is transferred through information transfer interfaces between multiple function modules.

In an embodiment of the present disclosure, the WDM optical link includes a wavelength-division multiplexing/demultiplexing device, an optical fiber, a beam splitter, and the like and is configured to connect multiple first optical modules of the central office device to second optical modules of multiple terminal devices.

In an embodiment of the present disclosure, the second optical module may include one or more groups of optical transmitters and optical receivers. When the second optical module includes multiple groups of optical transmitters and receivers, auto-negotiation channel information may be loaded through one or more of the multiple groups of optical transmitters and receivers.

In an embodiment of the present disclosure, the first optical link auto-negotiation channel communication module 901, a first channel selection module 903 (the optical link auto-negotiation channel is in a connected state), the first optical module 902 of the central office device, the second optical link auto-negotiation channel communication module 1101, the second channel selection module 1103 (the optical link auto-negotiation channel is in the connected state), the second optical module 1102 of the terminal device, and the WDM optical link constitute the optical link auto-negotiation channel.

Before the central office device and the terminal device establish the traffic data channel or the auxiliary management channel, the connected state of the optical link auto-negotiation channel is implemented through the first channel selection module 903 and the second channel selection module 1103 so that the optical link auto-negotiation channel is established. When the optical link auto-negotiation channel operates, a first traffic data communication module 904, a first auxiliary management channel communication module 905, and the first optical module 902 (an optical transmitter and an optical receiver) are in the unconnected state, the second traffic data communication module 1104, the second auxiliary management channel communication module 1105, and the second optical module 1102 (the optical transmitter and the optical receiver) are in the unconnected state, the first traffic data communication module 904 or the first auxiliary management channel communication module 905 cannot send data to the WDM optical link through the first optical module 902, the second traffic data communication module 1104 or the second auxiliary management channel communication module 1105 cannot receive data from the WDM optical link through the second optical module 1102, and only the optical link auto-negotiation information is transmitted on the WDM optical link. A rate, frequency, coding mode, or the like of the optical link auto-negotiation information is independent of the traffic data channel and the auxiliary management channel. That is, at the same time, the optical link auto-negotiation channel and electrical signaling and processing links other than the optical link included in the traffic data channel are independent of each other.

After the central office device finishes exchanging the optical link auto-negotiation information with the terminal device, the connected state of the traffic data channel is implemented through the first channel selection module 903 and the second channel selection module 1103 so that the traffic data channel is established and enabled.

In the embodiment of the present disclosure, the second optical link auto-negotiation channel communication module 1101, the second channel selection module 1103, the second control module 1106, and the second clock module 1107 may also be built in the second optical module 1102. Functions of the second optical link auto-negotiation channel communication module and the second control module may be implemented by an MCU of the optical module. The second channel selection module may be implemented by CDR of the optical module. The second clock module may also use a clock module of the optical module or recover from traffic data through a CDR chip. In this case, the function unit of the terminal device that constitutes the optical link auto-negotiation channel and participates in auto-negotiation is the second optical module 1102. When the operating mode of the auxiliary management channel needs to be negotiated, the second optical module 1102 retains the auxiliary management channel and control and feedback information interface for traffic data information.

In the embodiment of the present disclosure, when the WDM system does not need to negotiate the information about the operating wavelength channel of the terminal device, for example, the WDM system is an external seeded optical system or a self-seeded optical system, the second optical module of the terminal device uses only a reflective modulator/reflective amplified modulator as a transmitter to send a signal instead of a wavelength-tunable transmitter. In this case, the second control module 1106 adjusts an operating rate or the like of the transmitter according to the optical link auto-negotiation information.

Figure 14:
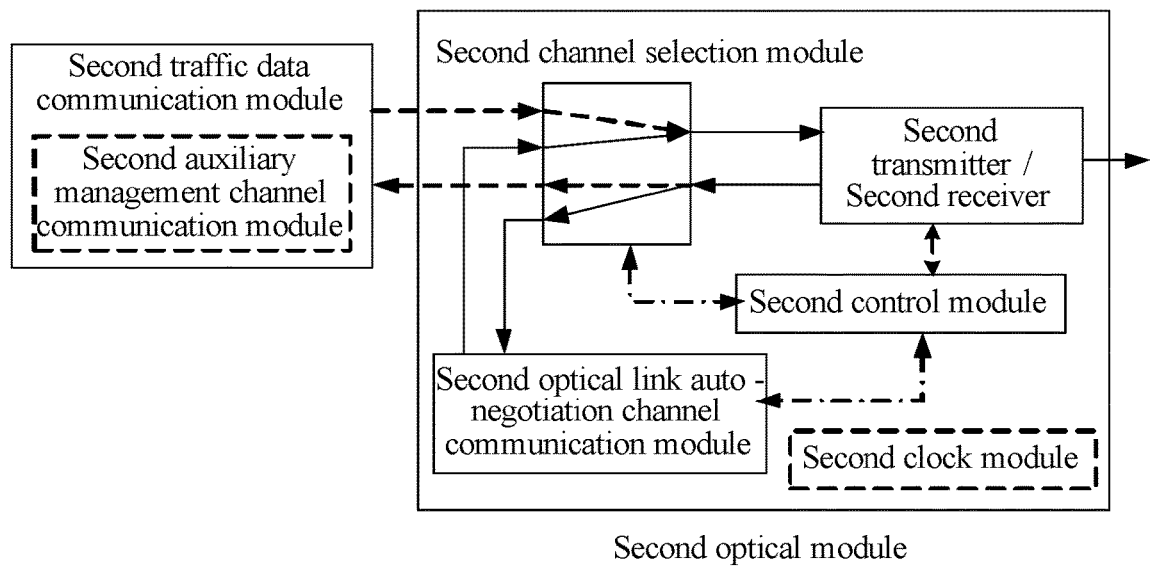
FIG. 14 is a structure diagram of a second optical module according to an embodiment of the present disclosure.

In the embodiment of the present disclosure, the second optical link auto-negotiation channel communication module, the second channel selection module, the second control module, and the second clock module may also be built in the second optical module. The functions of the second optical link auto-negotiation channel communication module and the second control module may be implemented by a microprogrammed control unit (MCU) of the second optical module. The second channel selection module may be implemented by CDR of the second optical module. The second clock module may also use a clock module of the second optical module or recover from traffic data through a CDR chip. In this case, the function unit of the terminal device that constitutes the optical link auto-negotiation channel and participates in auto-negotiation is the second optical module, as shown in FIG. 14.

In the embodiments of the present disclosure, no additional pilot tone modulation signal needs to be introduced so that the complexity and cost of the optical module will not be increased. Moreover, the independence from an optical link for traffic data will neither deteriorate the signal quality of the optical link for traffic data nor introduce an optical power cost.

Example Four

In examples one and two, a first channel selection module 903 is added to a central office device for establishing an optical link auto-negotiation channel, and a second channel selection module 1103 is added to a terminal device. The first channel selection module 903 and the second channel selection module 1103 are implemented by additional high-speed electric processing chips. An integration level implemented by the terminal device is challenged particularly when the first channel selection module 903 is built in a first optical module 902 and the second channel selection module 1103 is built in a second optical module 1102. In this embodiment, neither the structures of existing modules nor interfaces between the existing modules and devices are changed, and optical link auto-negotiation information is transferred by multiplexing Serial Data Line (SDA) and Serial Clock Line (SCL) control pin of the first optical module 902 and the second optical module 1102.

Figure 15:
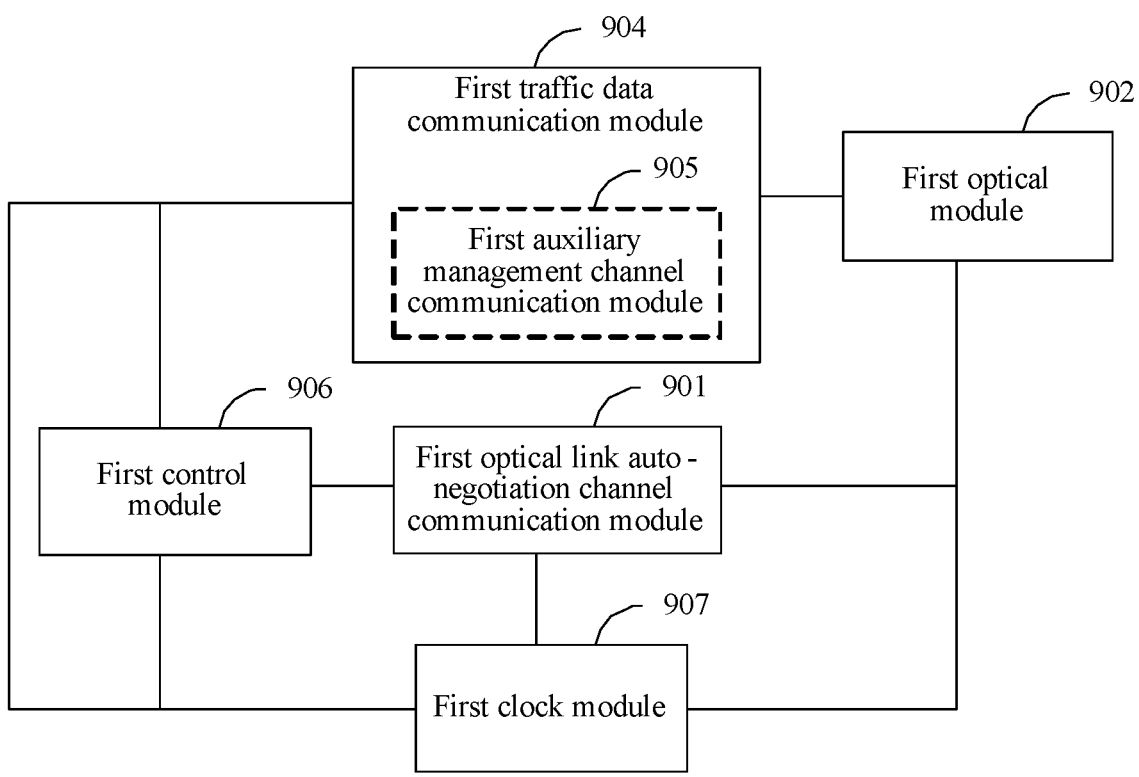
FIG. 15 is a structure diagram of a central office device in example four of the present disclosure.

Referring to FIG. 15, the central office device includes a first optical link auto-negotiation channel communication module 901, the first optical module 902, a first traffic data communication module 904, and a first control module 906.

The first optical link auto-negotiation channel communication module 901 is connected to the first optical module 902 through an I²C interface.

Functions of the preceding multiple modules are consistent with those of the corresponding modules of the central office device in the preceding embodiments. A difference is that the central office device in this example does not include the first channel selection module 903. The first optical link auto-negotiation channel communication module 901 exchanges the optical link auto-negotiation information and clock information with the terminal device through the I²C interface and SDA and SCL control pins of the first optical module 902.

The optical link auto-negotiation information sent by the first optical link auto-negotiation channel communication module 901 may be implemented by a CPLD device, and the first optical link auto-negotiation channel communication module 901 sends a corresponding digital sequence of 1 and 0 to the SDA and SCL control pins of the first optical module 902 after performing framing, coding (including scrambling), FEC coding (not necessary), and parallel-to-serial conversion on the optical link auto-negotiation information. After the control pins of the first optical module 902 receive the corresponding digital sequence of 1 and 0 of the optical link auto-negotiation information, a bit "1" and a bit "0" may be represented by two states: a non-light state and a light state or two states: "from light to non-light" and "from non-light to light" of a laser. In the present disclosure, the "non-light" state means that a transmitter of an optical module emits light whose power is lower than a certain threshold so that an LOS alarm of a receiver of the optical module is caused. Otherwise, the transmitter is in the light state. A change between the light state and the non-light state of the laser is embodied as an optical pulse.

In an implementation, a clock the same as the optical link auto-negotiation information is used for writing "1" or "0" into a bit of an "Address A2h, Byte 110, Bit 6" register of the first optical module 902 through the I²C interface (referring to SFF-8472 standard) so that the light state and the non-light state of the first optical module 902 are achieved.

The first optical link auto-negotiation channel communication module 901 reads the digital sequence of 1 and 0 from the SDA and SCL control pins of the first optical module 902 and obtains feedback information sent by the terminal device through serial-to-parallel conversion, FEC decoding (not necessary), decoding (including synchronization and descrambling), frame parsing, and the like.

In an implementation, the first optical link auto-negotiation channel communication module 901 reads bits (characterizing LOS states of a receiver of the first optical module 902) of an "Address A2h, Byte 110, Bit 1" register of the first optical module 902 through the I²C interface to obtain the digital sequence of 1 and 0 sent by the terminal device.

Figure 16:
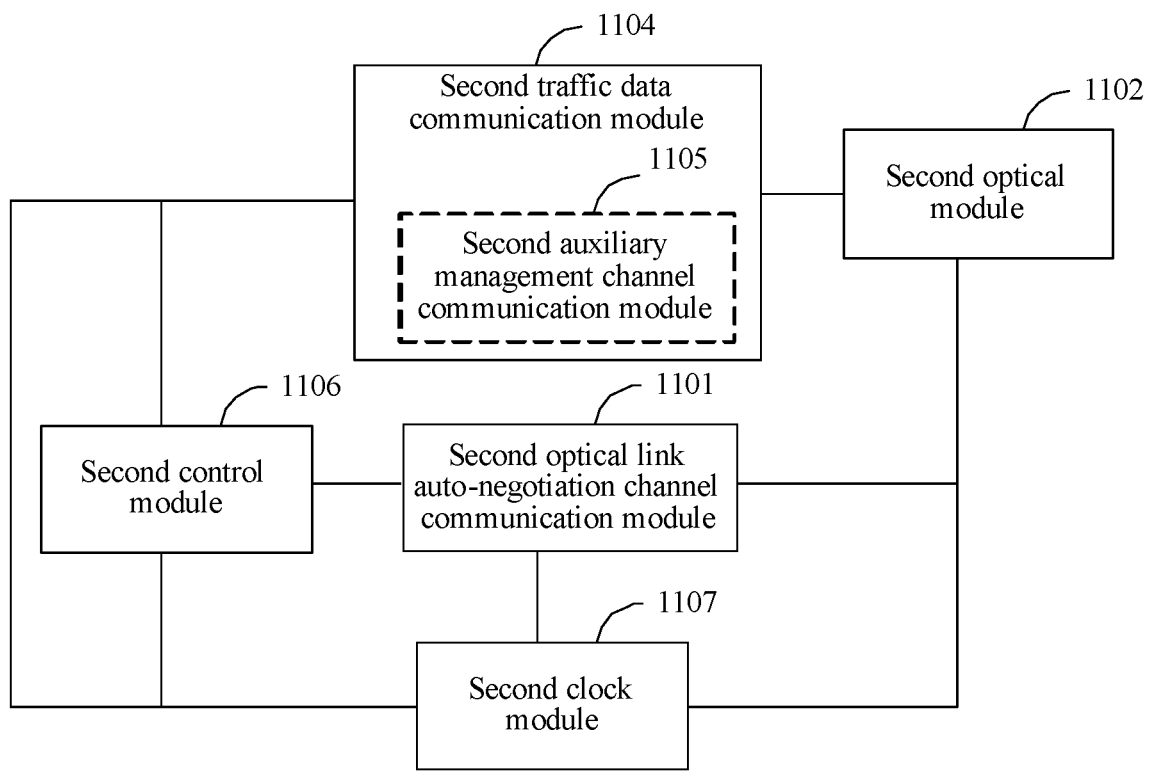
FIG. 16 is a structure diagram of a terminal device in example four of the present disclosure.

Referring to FIG. 16, the terminal device includes a second optical link auto-negotiation channel communication module 1101, the second optical module 1102, a second traffic data communication module 1104, and a second control module 1106.

The second optical link auto-negotiation channel communication module 1101 is connected to the second optical module 1102 through an I²C interface.

Functions of the preceding multiple modules are consistent with those of the corresponding modules of the terminal device in the preceding embodiments. A difference is that the terminal device in this example does not include the second channel selection module 1103. The second optical link auto-negotiation channel communication module 1101 exchanges the optical link auto-negotiation information and clock information with the central office device through the I²C interface and SDA and SCL control pins of the second optical module 1102.

The optical link auto-negotiation information sent by the second optical link auto-negotiation channel communication module 1101 may be implemented by a CPLD device, and the second optical link auto-negotiation channel communication module 1101 reads a digital sequence of 1 and 0 from the SDA and SCL control pins of the second optical module 1102 and obtains a digital sequence of 1 and 0 corresponding to the optical link auto-negotiation information sent by the central office device through serial-to-parallel conversion, FEC decoding (not necessary), decoding (including synchronization and descrambling), frame parsing, and the like.

In an implementation, the second optical link auto-negotiation channel communication module 1101 reads bits (characterizing LOS states of a receiver of the second optical module 1102) of an "Address A2h, Byte 110, Bit 1" register of the second optical module 1102 through the I²C interface to obtain the digital sequence of 1 and 0 sent by the central office device.

The second optical link auto-negotiation channel communication module 1101 sends a corresponding digital sequence of 1 and 0 to the SDA and SCL control pins of the second optical module 1102 after performing framing, coding (including scrambling), FEC coding (not necessary), and parallel-to-serial conversion on the feedback information. After the control pins of the second optical module 1102 receive the corresponding digital sequence of 1 and 0 of the feedback information, the bit "1" and the bit "0" may be represented by two states: the non-light state and the light state or two states: "from light to non-light" and "from non-light to light" of the laser.

In an implementation, a clock the same as the feedback information is used for writing "1" or "0" into a bit of an "Address A2h, Byte 110, Bit 6" register of the second optical module 1102 through the I²C interface (referring to SFF-8472 standard) so that the light state and the non-light state of the second optical module 1102 are achieved.

In this example, the central office device and the terminal device may use the same fixed clock, and the clock information sent by the terminal device may be recovered from the received optical link auto-negotiation information sent by the central office device.

The optical link auto-negotiation information or the feedback information may be transferred through light and non-light on an optical link as follows.

The central office device sends a regular non-light optical signal to the terminal device, where the optical signal forms LOS alarms and codes at the terminal device. The terminal device parses the optical link auto-negotiation information through the codes, adjusts its own operating parameter according to the optical link auto-negotiation information, and sends a regular non-light optical signal to the central office device, where the optical signal forms LOS alarms and codes at the central office device. The central office device parses the feedback information through the codes.

Figure 17:
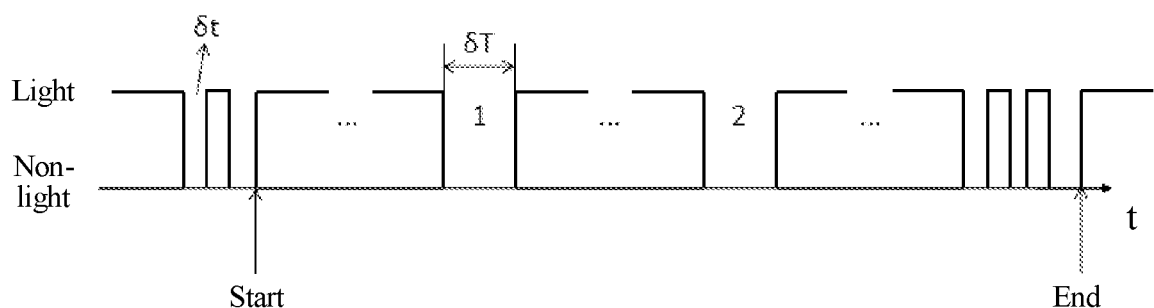
FIG. 17 is a schematic diagram of a management channel control optical signal in example four of the present disclosure.

FIG. 17 is a schematic diagram of an optical link auto-negotiation signal. As shown in FIG. 17, in the embodiment of the present disclosure, the optical link auto-negotiation information is sent through the optical link auto-negotiation signal, and the optical link auto-negotiation signal has a start identifier and an end identifier which are "010" and "01010" respectively and corresponding codes of the optical link auto-negotiation information (that is, the optical link auto-negotiation information) in the middle. "0" and "1" in the start identifier and the end identifier each last δt which may be set to 1 ms, and "0" and "1" in the codes of the optical link auto-negotiation information are each controlled to last δT which may be set to 3 ms.

Possible examples of the codes of the optical link auto-negotiation information are listed in Table 4. Multiple parts of the optical link auto-negotiation information are separated by delimiting indicators which separate fields and indicate a definition of the next field.

TABLE 4

| Field Name | Binary Example |
| --- | --- |
| Rate of the optical link auto-negotiation channel | 25G: 0000, 10G: 0001, 1G: 0010, . . . |
| Information on an operating wavelength channel | ch1: 000001, ch2: 000010, ch3: 000011. . . |
| Enabled or disabled state of FEC of a WDM PON itself (on or off state of FEC between the central office device and the terminal device) | Enabled: 01, disabled: 00; |
| FEC type of the WDM PON itself (FEC type between the central office device and the terminal device) | RS (528,514): 0001, RS (544,514): 0010, RS (255,223): 0011, LDPC: 0100, . . . |
| Communication protocol | PON: 00, CPRI: 01, eCPRI: 10, . . . |
| Operating mode of an auxiliary management channel | Mode one: 01, mode two: 10, . . . |
| Rate of a traffic data channel | 10G: 00, 25G: 01 |
| Enabled or disabled state of FEC between a WDM PON device and a traffic device | Enabled: 01, disabled: 00; |
| Delimiting indicator | Wavelength: 110011, FEC switch of the WDM PON itself: 110111, FEC type of the WDM PON itself: 111011, protocol: 111011, operating mode of the auxiliary management channel: 111111, WDM PON rate: 110001, etc. |

After the terminal device receives a management channel control signal, the terminal device extracts the optical link auto-negotiation information by using an LOS alarm signal, adjusts its own operating parameter, and sends one piece of feedback information to the central office device. After receiving the feedback information, the central office device starts to perform normal communication with the terminal device. Negotiation procedures are consistent with those described in examples one and two. A difference of this example from examples one and two is that the rate of the optical link auto-negotiation channel cannot be negotiated through a preamble of an optical link auto-negotiation information frame and can only be defined in an information field.

In this example, the first optical link auto-negotiation channel communication module 901 and the first optical module 902 of the central office device communicate through the I²C interface, the second optical link auto-negotiation channel communication module 1101 and the second optical module 1102 of the terminal device communicate through the I²C interface, and the optical link auto-negotiation information is transferred through read and write operations performed on the registers of the first optical module 902 and the second optical module 1102. The first traffic data communication module 904 is connected to the first optical module 902 by a high-speed data signal line. An interface between the first traffic data communication module 904 and the first optical module 902 is also used between a first auxiliary management channel communication module 905 and the first optical module 902. The second traffic data communication module 1104 is connected to the second optical module 1102 by a high-speed data signal line. An interface between the second traffic data communication module 1104 and the second optical module 1102 is also used between a second auxiliary management channel communication module 1105 and the second optical module 1102. Therefore, the optical link auto-negotiation channel in this embodiment is independent of the traffic data channel and the auxiliary management channel. A rate, frequency, coding mode, or the like of the optical link auto-negotiation information is independent of the traffic data channel.

In this example, before the traffic data channel is established, the first optical link auto-negotiation channel communication module 901 sends the optical link auto-negotiation information to the first optical module 902 through the I²C interface, converts the optical link auto-negotiation information into an optical link auto-negotiation optical signal through the first optical module 902, and transmits the optical link auto-negotiation optical signal on the WDM optical link. Since the first optical module 902 is turned on and off to emit the optical signal, traffic data cannot be transmitted on the WDM optical link at the same time, the traffic data channel or the auxiliary management channel cannot send or receive data to or from the WDM optical link through the first optical module 902, and only the optical link auto-negotiation information is transmitted on the WDM optical link. That is, at the same time, the optical link auto-negotiation channel and electrical signaling and processing links other than the optical link included in the traffic data channel are independent of each other.

In this example, the optical link auto-negotiation information is sent by a method similar to those in examples one and two. The optical link auto-negotiation information is transmitted through the optical link auto-negotiation information frame (a signal with a frame format), and the feedback information is transmitted through a feedback information frame (a signal with a frame format).

In this example, after the optical link auto-negotiation information is received and parsed, the operating parameter of the terminal device is adjusted through the second control module 1106. After the operating parameter is adjusted, the optical link auto-negotiation channel stops sending information, and the traffic data channel is established and enabled.

Similarly, in this example, no additional pilot tone modulation signal needs to be introduced so that the complexity and cost of the optical module will not be increased. Moreover, the independence from an optical link for traffic data will neither deteriorate the signal quality of the optical link for traffic data nor introduce an optical power cost.

Example Five

Figure 19:
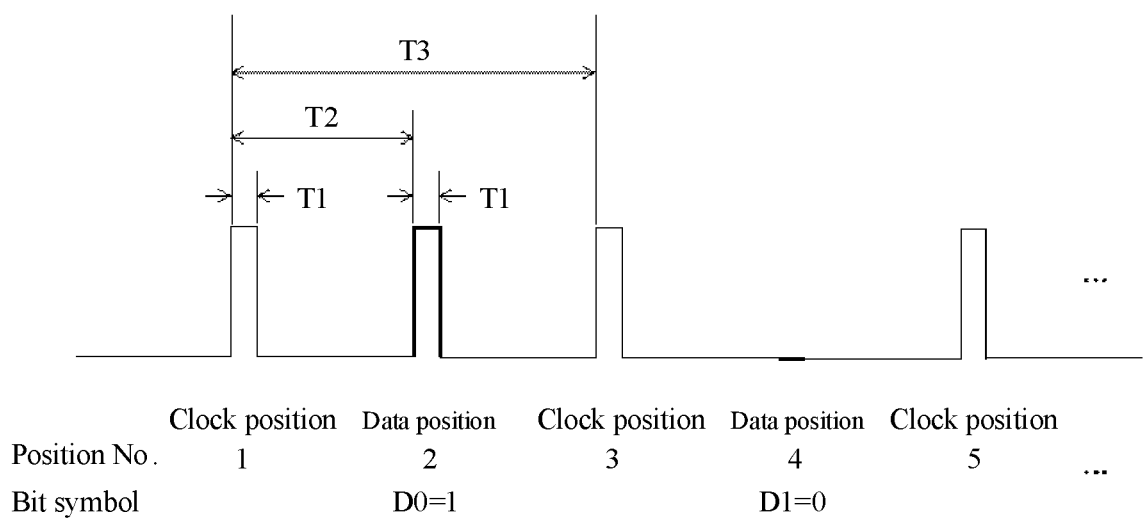
FIG. 19 is a structure diagram of optical link auto-negotiation information in example five of the present disclosure.

In examples one, two, and four, an optical link auto-negotiation information frame consists of a preamble and information bits including various types of negotiation information. The preamble carries optical link auto-negotiation for synchronizing a receiving frequency of an optical link auto-negotiation channel, and clock information is no longer sent after synchronization. In this example, another structure of optical link auto-negotiation information is provided. In this structure, the optical link auto-negotiation information is sent by using information pulses interleaved with clock pulses (as shown in FIG. 19). Different types of optical link auto-negotiation information are periodically sent in chronological order (as shown in FIG. 19). Clock pulses and information pulses are composed of optical pulses at certain intervals.

Figure 18:
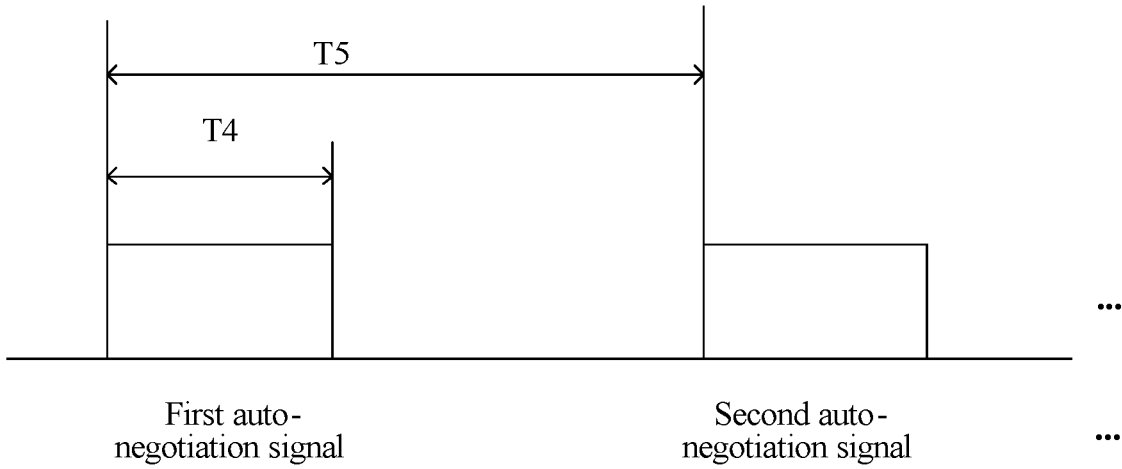
FIG. 18 is a timing diagram of optical link auto-negotiation information in example five of the present disclosure.

As shown in FIG. 18, a central office device sends optical link auto-negotiation information to a terminal device, and different optical link auto-negotiation signals (a first auto-negotiation signal and a second auto-negotiation signal in FIG. 18) represent different optical link auto-negotiation information. For example, first optical link auto-negotiation information (the first auto-negotiation signal in FIG. 18) may be information about an operating wavelength channel, second optical link auto-negotiation information (the second auto-negotiation signal in FIG. 18) may be a rate of the optical link auto-negotiation channel, and so on. Optical link auto-negotiation information has the same duration of T4, and an interval between different optical link auto-negotiation information is T5.

FIG. 19 is a structure diagram of the optical link auto-negotiation information. As shown in FIG. 19, one piece of optical link auto-negotiation information has (2n+1) optical pulse positions in total, where n is the number of bits of the optical link auto-negotiation information. A start optical pulse and an end optical pulse are clock pulses, an interval between clock pulses is T3, information pulses are interposed between clock pulses, both the information pulse and the clock pulse have a duration of T1, and an interval between the information pulse and the clock pulse is T2. If there are 33 pulse positions in total, there are 17 clock pulses and 16 information pulses. The presence of an optical pulse at the information pulse indicates that this bit is "1", and the absence of an optical pulse at the information pulse indicates that this bit is "0". As shown in FIG. 19, bold parts represent "1" and "0".

Figure 20:
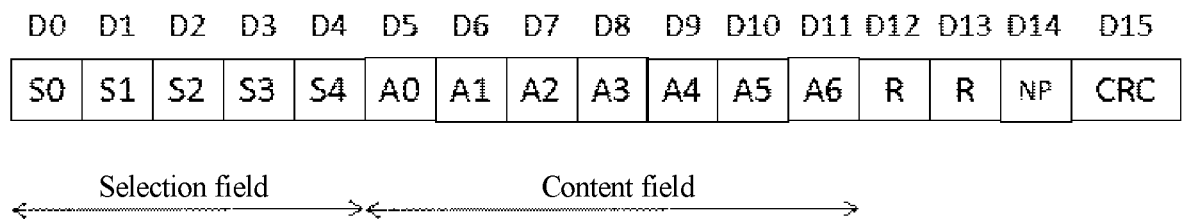
FIG. 20 is a schematic diagram of optical link auto-negotiation information obtained through separate extraction of bits corresponding to data pulses in example five of the present disclosure.

FIG. 20 is a schematic diagram of optical link auto-negotiation information obtained through separate extraction of bits corresponding to data pulses. As shown in FIG. 20, for the optical link auto-negotiation information with 33 optical pulse positions, the number of bits of the optical link auto-negotiation information is 16, D0 to D15 respectively. First five bits, S0 to S4, are a selection field which indicates which type of optical link auto-negotiation information the subsequent content is, A0 to A6 are a control content field which indicates a value of the optical link auto-negotiation information, R represents a reserved bit, and NP represents whether optical link auto-negotiation information follows. When NP is 1, it indicates that optical link auto-negotiation information follows. When NP is 0, it indicates that the optical link auto-negotiation information is sent completely. The last bit is a cyclic redundancy check (CRC) bit.

Possible examples of T1 to T5 are given in Table 5. One possible example of D0 to D15 is given in Table 6.

TABLE 5

| Symbol | Name | Value |
|---|---|---|
| T1 | Duration of a clock/information optical pulse | 1 ms |
| T2 | Interval between a clock pulse and an information pulse | 5 ms |
| T3 | Interval between clock pulses | 10 ms |
| T4 | Duration of an optical link auto-negotiation signal frame | 161 ms |
| T5 | Interval between optical link auto-negotiation signal frames | 100 ms |

TABLE 6

| S0-S4 | Control Content | A0-A6 |
|---|---|---|
| 00000 | Rate | 0000001: 1G, 0001010: 10G, 0011001: 25G, . . . |
| 00001 | Wavelength | 0000001: ch1, 0000010: ch2, . . . |
| 00010 | FEC | A0 = 1: FEC of a device itself is on; A0 = 0: FEC of the device itself is off; A1 = 1: transmitted data is subjected to FEC coding; A1 = 0: transmitted data is not subjected to FEC coding; A2-A6: 00001: RS; 00010: BCH; 00011: LDPC; . . . |
| 00011 | Protocol | 0000001: PON, 0000010: CPRI, 0000011: eCPRI, . . . |
| 00100 | Channel management manner after normal communication | 0000001: AMCC, 0000010: in-band management, . . . |

Sending procedures are the same as those in the preceding examples. When receiving the optical link auto-negotiation information, the terminal device adjusts its own operating parameter and sends feedback information to the central office device. When receiving the feedback information, the central office device establishes and enables a traffic data channel and begins normal communication. If the feedback information is not received, the central office device continues sending the optical link auto-negotiation information.

Example Six

When a WDM system is a passive WDM system, the WDM system does not include PON OLT and ONU devices. In this example, optical link auto-negotiation information may be implemented by an optical module of a central office (a first optical module) and an optical module of a terminal (a second optical module). In this case, the optical link auto-negotiation information includes only information about an operating wavelength channel. Similar to examples four and five, this example transmits the optical link auto-negotiation information through a state of an optical switch and an LOS alarm signal. Since only the information about the operating wavelength channel is transmitted, no complex circuit is required to perform data processing and frame parsing on the optical link auto-negotiation information, and optical link auto-negotiation channel information may be transmitted by counting optical pulses within a fixed time period.

Figure 21:
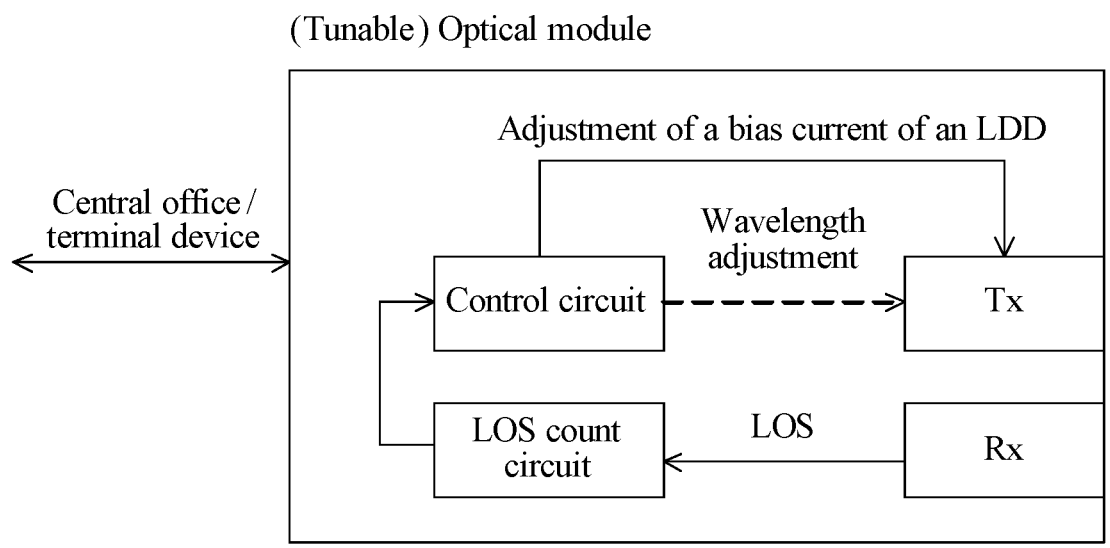
FIG. 21 is a structure diagram of a link establishment apparatus in example six of the present disclosure.

As shown in FIG. 21, an exchange of the optical link auto-negotiation information may be implemented by the optical module of the central office and the optical module of the terminal in any one of manners described below.

Manner one: the exchange of the optical link auto-negotiation information is implemented by adjusting a magnitude of a bias current.

The optical module of the central office adjusts a magnitude of a bias current of a first transmitter through a first control circuit in a first optical link auto-negotiation channel communication module disposed in the first optical module within the fixed time period to turn on or off the first transmitter, so as to transmit the optical link auto-negotiation information. In an embodiment, the first transmitter is turned off when the magnitude of the bias current of the first transmitter is adjusted below a threshold current and the first transmitter is turned on when the magnitude of the bias current of the first transmitter is adjusted above the threshold current, so as to transmit an optical signal to the optical module of the terminal.

The optical module of the terminal counts LOS alarms of a second receiver through a second LOS count circuit in a second optical link auto-negotiation channel communication module disposed in the second optical module to obtain the information about the operating wavelength channel and adjusts a wavelength of the second transmitter according to the obtained wavelength negotiation information through a second control circuit in the second optical link auto-negotiation channel communication module disposed in the second optical module.

The optical module of the terminal adjusts a magnitude of a bias current of a second transmitter through the second control circuit within a fixed time period to turn on or off the second transmitter, so as to transmit feedback information. In an embodiment, the second transmitter is turned off when the magnitude of the bias current of the second transmitter is adjusted below a threshold current and the second transmitter is turned on when the magnitude of the bias current of the second transmitter is adjusted above the threshold current, so as to transmit an optical signal to the optical module of the central office.

The optical module of the central office counts LOS alarms of a first receiver to obtain the feedback information and begins a normal operation.

Manner two: the exchange of the optical link auto-negotiation information is implemented by adjusting a magnitude of a bias voltage.

The optical module of the central office adjusts a magnitude of a bias voltage of the first transmitter through the first control circuit within the fixed time period to turn on or off the first transmitter, so as to transmit the optical link auto-negotiation information. In an embodiment, the first transmitter is turned off when the magnitude of the bias voltage of the first transmitter is adjusted below a threshold voltage and the first transmitter is turned on when the magnitude of the bias voltage of the first transmitter is adjusted above the threshold voltage, so as to transmit an optical signal to the optical module of the terminal.

The optical module of the terminal counts LOS alarms of the second receiver to obtain the information about the operating wavelength channel and adjusts a wavelength of the second transmitter according to the obtained wavelength negotiation information.

The optical module of the terminal adjusts a magnitude of a bias voltage of the second transmitter through the second control circuit within the fixed time period to turn on or off the second transmitter, so as to transmit the feedback information. In an embodiment, the second transmitter is turned off when the magnitude of the bias voltage of the second transmitter is adjusted below a threshold voltage and the second transmitter is turned on when the magnitude of the bias voltage of the second transmitter is adjusted above the threshold voltage, so as to transmit an optical signal to the optical module of the central office.

The optical module of the central office counts LOS alarms of the first receiver to obtain the feedback information and begins the normal operation.

Manner three: the exchange of the optical link auto-negotiation information is implemented by controlling an optical switch or an SOA or a VOA to turn and off.

The optical module of the central office controls a first optical switch or a first SOA or a first VOA to turn on or off through the first control circuit within the fixed time period to turn on or off the first transmitter, so as to transmit the optical link auto-negotiation information. In an embodiment, the first transmitter is turned off when the first optical switch or the first SOA or the first VOA is controlled to turn off and the first transmitter is turned on when the first optical switch or the first SOA or the first VOA is controlled to turn on, so as to transmit an optical signal to the optical module of the terminal.

The optical module of the terminal counts the LOS alarms of the second receiver to obtain the information about the operating wavelength channel and adjusts a wavelength of the second transmitter according to the obtained wavelength negotiation information.

The optical module of the terminal controls a second optical switch or a second SOA or a second VOA to turn on or off through the second control circuit within the fixed time period to turn on or off the second transmitter, so as to transmit the feedback information. In an embodiment, the second transmitter is turned off when the second optical switch or the second SOA or the second VOA is controlled to turn off and the second transmitter is turned on when the second optical switch or the second SOA or the second VOA is controlled to turn on, so as to transmit an optical signal to the optical module of the central office.

The optical module of the central office counts the LOS alarms of the first receiver to obtain the feedback information and begins the normal operation.

In this example, an optical module may acquire information about an operating wavelength channel to be negotiated through a central office device or a terminal device or may attempt to send a wavelength of a transmitter when an optical link auto-negotiation channel operates and adjust and re-negotiate the wavelength of the transmitter according to whether feedback information is received.

In this example, an operating parameter of the second transmitter is adjusted through the second control circuit in the second optical module so that an on or off state of an optical signal is obtained and required optical link auto-negotiation information is transmitted on a WDM optical link, and the number of on and off of the optical signal is identified by the second LOS count circuit so that the optical link auto-negotiation information is obtained. Thus, the optical link auto-negotiation channel is established. After the optical link auto-negotiation channel is established, since an optical transmitter is turned on and off to emit an optical signal, a traffic data channel message cannot be transmitted on the WDM optical link at the same time, a traffic data channel or an auxiliary management channel cannot send or receive data to or from the WDM optical link through the first optical module or the second optical module, and only the optical link auto-negotiation information is transmitted on the WDM optical link. That is, at the same time, the optical link auto-negotiation channel and electrical signaling and processing links other than the optical link included in the traffic data channel are independent of each other. In this example, after the optical link auto-negotiation information is received and parsed, an operating parameter of the second optical module is adjusted through the second control circuit. After the operating parameter is adjusted, the optical link auto-negotiation channel stops sending information, and the traffic data channel is established and enabled.

Another embodiment of the present disclosure further provides a link establishment apparatus including a processor and a computer-readable storage medium. The computer-readable storage medium stores instructions which are executed by the processor so that any one of the methods described above is performed.

Another embodiment of the present disclosure further provides a computer-readable storage medium. The computer-readable storage medium stores a computer program which is executed by a processor so that any one of the methods described above is performed.

Function modules/units in all or part of the steps of the method, the system, and the apparatus disclosed in the preceding description may be implemented as software, firmware, hardware, or any appropriate combination thereof. In the hardware implementation, the division of the preceding function modules/units may not correspond to the division of physical components. For example, one physical component may have multiple functions, or one function or step may be performed jointly by multiple physical components. Some or all components may be implemented as software executed by a processor such as a digital signal processor or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). The term computer storage media include volatile and nonvolatile as well as removable and non-removable media implemented in a method or technology for storage of information (such as computer-readable instructions, data structures, program modules, or other data). The computer storage media include random-access memories (RAMs), read-only memories (ROMs), electrically erasable programmable read-only memories (EE-PROMs), flash memories or other memory technologies; compact disc read-only memories (CD-ROMs), digital video disks (DVDs) or other optical disk memories; magnetic cassettes, magnetic tapes, magnetic disk memories or other magnetic storage devices, or other media that can be used for storing desired information and that can be accessed by a computer. Additionally, the communication media generally include computer-readable instructions, data structures, program modules, or other data in carriers or in modulated data signals transported in other transport mechanisms and may include information delivery media.

What is claimed is:

1. A link establishment apparatus, comprising an optical link auto-negotiation channel communication module and an optical module which constitute an optical link auto-negotiation channel;

wherein the optical link auto-negotiation channel communication module is configured to exchange optical link auto-negotiation information with a terminal device through the optical link auto-negotiation channel;

wherein the optical link auto-negotiation channel is independent of a traffic data channel; and the optical link auto-negotiation information comprises at least two of: information about an operating wavelength channel of the terminal device, an enabled or disabled state of forward error correction between a central office device and the terminal device, a forward error correction type between a central office device and the terminal device, and an operating mode of an auxiliary management channel, wherein the optical link auto-negotiation channel communication module is configured to send the optical link auto-negotiation information in one of the following manners:

sending optical link auto-negotiation channel information to a transmit signal pin of a transmitter of the optical module; or adjusting, according to the optical link auto-negotiation information, a transmitter of the optical module to change between a light state and a non-light state to send an optical pulse;

wherein the optical link auto-negotiation channel communication module is configured to receive feedback information in one of the following manners:

receiving the feedback information from a receive signal pin of a receiver of the optical module; or obtaining the feedback information through an optical pulse or a number of optical pulses that is formed by a change between the light state and the non-light state and received by a receiver of the optical module, the optical link auto-negotiation channel communication module is built in the optical module, at least one of a channel selection module, a control module, or a clock module is built in the optical module.

2. The apparatus of claim 1, wherein the optical link auto-negotiation channel communication module is configured to:

send at least one of a plurality of contents comprised in the optical link auto-negotiation information to the terminal device through the optical link auto-negotiation channel;

in a case of receiving feedback information from the terminal device, finish exchanging sent optical link auto-negotiation information; and repeat the preceding process until exchanges of all the optical link auto-negotiation information are finished.

3. The apparatus of claim 1, wherein the optical link auto-negotiation channel communication module is configured to send the optical pulse in any one of following manners:

adjusting a magnitude of a bias current of the transmitter of the optical module;

adjusting a magnitude of a bias voltage of the transmitter of the optical module;

controlling an optical switch of the optical module to turn on and off;

controlling a semiconductor optical amplifier of the optical module to turn on and off; or controlling an adjustable optical attenuator of the optical module to turn on and off.

4. The apparatus of claim 1, wherein in a case where the optical link auto-negotiation channel communication module sends the optical link auto-negotiation information by sending the optical link auto-negotiation channel information to the transmit signal pin of the transmitter of the optical module and receives the feedback information by receiving the feedback information from the receive signal pin of the receiver of the optical module, the apparatus further comprises a channel selection module and a traffic data communication module;
> wherein the channel selection module is connected to the optical link auto-negotiation channel communication module, the optical module, and the traffic data communication module, separately;
> wherein the channel selection module is configured to select one of the optical link auto-negotiation channel communication module or the traffic data communication module, which is to be connected to the optical module; and
> wherein the traffic data communication module is configured to send traffic data to the terminal device and receive traffic data sent by the terminal device.

5. The apparatus of claim 1, wherein in a case where the optical link auto-negotiation channel communication module sends the optical link auto-negotiation information by adjusting the transmitter of the optical module to change between the light state and the non-light state to send the optical pulse and obtains the feedback information through the optical pulse or the number of optical pulses that is formed by the change between the light state and the non-light state and received by the receiver of the optical module, the optical link auto-negotiation channel communication module is connected to the optical module through an Inter-Integrated Circuit interface;
> wherein the optical link auto-negotiation channel communication module performs a read operation or a write operation on a register of the optical module through the Inter-Integrated Circuit interface to exchange the optical link auto-negotiation information with the terminal device.

6. The apparatus of claim 1, further comprising:
a control module connected to the optical link auto-negotiation channel communication module and configured to:
control the optical link auto-negotiation channel communication module to exchange the optical link auto-negotiation information with the terminal device through the optical link auto-negotiation channel.

7. The apparatus of claim 6, wherein the control module is further connected to the channel selection module and further configured to control a channel selection module to select one of the optical link auto-negotiation channel communication module or the traffic data communication module, which is to be connected to the optical module.

8. The apparatus of claim 1, wherein
in a case where the optical link auto-negotiation channel communication module is built in the optical module and the optical link auto-negotiation channel communication module sends the optical link auto-negotiation information by adjusting the transmitter of the optical module to change between the light state and the non-light state to send the optical pulse and obtains the feedback information through the optical pulse or the number of optical pulses that is formed by the change between the light state and the non-light state and received by the receiver of the optical module, the optical link auto-negotiation channel communication module and connections between the optical link auto-negotiation channel communication module and the transmitter and the receiver of the optical module are implemented by internal circuits of the optical module.

9. A link establishment apparatus, comprising an optical link auto-negotiation channel communication module and an optical module which constitute an optical link auto-negotiation channel;
> wherein the optical link auto-negotiation channel communication module is configured to exchange optical link auto-negotiation information with a central office device through the optical link auto-negotiation channel;
> wherein the optical link auto-negotiation channel is independent of a traffic data channel; and
> the optical link auto-negotiation information comprises at least two of: information about an operating wavelength channel of a terminal device, an enabled or disabled state of forward error correction between the central office device and a terminal device, a forward error correction type between the central office device and a terminal device, and an operating mode of an auxiliary management channel,
> wherein the optical link auto-negotiation channel communication module is configured to receive the optical link auto-negotiation information in one of the following manners:
> receiving optical link auto-negotiation channel information from a receive signal pin of a receiver of the optical module; or
> obtaining optical link auto-negotiation channel information through an optical pulse or a number of optical pulses that is formed by a change between a light state and a non-light state and received by a receiver of the optical module;
> wherein the optical link auto-negotiation channel communication module is configured to send feedback information in one of the following manners:
> sending optical link auto-negotiation channel information to a transmit signal pin of a transmitter of the optical module; or
> adjusting, according to the feedback information, a transmitter of the optical module to change between the light state and the non-light state to send an optical pulse,
> the optical link auto-negotiation channel communication module is built in the optical module, at least one of a channel selection module, a control module, or a clock module is built in the optical module.

10. The apparatus of claim 9, wherein the optical link auto-negotiation channel communication module is configured to:
receive the optical link auto-negotiation information and adjust an operating parameter according to the optical link auto-negotiation information;
send feedback information to the central office device through the optical link auto-negotiation channel and finish exchanging the received optical link auto-negotiation information; and
repeat the preceding process until exchanges of all the optical link auto-negotiation information are finished.

11. The apparatus of claim 9, wherein the optical link auto-negotiation channel communication module is configured to send the optical pulse in any one of the following manners:
adjusting a magnitude of a bias current of the transmitter of the optical module;
adjusting a magnitude of a bias voltage of the transmitter of the optical module;
controlling an optical switch of the optical module to turn on and off;

controlling a semiconductor optical amplifier of the optical module to turn on and off; or controlling an adjustable optical attenuator of the optical module to turn on and off.

12. The apparatus of claim 9, wherein in a case where the optical link auto-negotiation channel communication module receives the optical link auto-negotiation information by receiving the optical link auto-negotiation channel information from the receive signal pin of the receiver of the optical module and sends the feedback information by sending the optical link auto-negotiation channel information to the transmit signal pin of the transmitter of the optical module, the apparatus further comprises a channel selection module and a traffic data communication module;

wherein the channel selection module is connected to the optical link auto-negotiation channel communication module, the optical module, and the traffic data communication module, separately;

wherein the channel selection module is configured to select one of the optical link auto-negotiation channel communication module or the traffic data communication module, which is to be connected to the optical module; and wherein the traffic data communication module is configured to send traffic data to the central office device and receive traffic data sent by the central office device.

13. The apparatus of claim 9, wherein in a case where the optical link auto-negotiation channel communication module obtains the optical link auto-negotiation channel information through the optical pulse or the number of optical pulses that is formed by the change between the light state and the non-light state and received by the receiver of the optical module and adjusts, according to the feedback information, the transmitter of the optical module to change between the light state and the non-light state to send the optical pulse, the optical link auto-negotiation channel communication module is connected to the optical module through an Inter-Integrated Circuit interface;

wherein the optical link auto-negotiation channel communication module performs a read operation or a write operation on a register of the optical module through the Inter-Integrated Circuit interface to exchange the optical link auto-negotiation information with the central office device.

14. The apparatus of claim 9, further comprising:

a control module connected to the optical link auto-negotiation channel communication module and the traffic data communication module, wherein the optical link auto-negotiation channel communication module is further configured to:

send the received optical link auto-negotiation information to the control module; and the control module is further configured to:

receive the optical link auto-negotiation information, adjust an operating parameter of a traffic data module according to the optical link auto-negotiation information, and send the feedback information to the optical link auto-negotiation channel communication module.

15. The apparatus of claim 14, wherein the control module is further connected to the channel selection module and further configured to control a channel selection module to select one of the optical link auto-negotiation channel communication module or the traffic data communication module, which is to be connected to the optical module.

16. The apparatus of claim 9, wherein in a case where the optical link auto-negotiation channel communication module is built in the optical module and the optical link auto-negotiation channel communication module obtains the optical link auto-negotiation channel information through the optical pulse or the number of optical pulses that is formed by the change between the light state and the non-light state and received by the receiver of the optical module and adjusts, according to the feedback information, the transmitter of the optical module to change between the light state and the non-light state to send the optical pulse, the optical link auto-negotiation channel communication module is connected to the transmitter and the receiver of the optical module by internal circuits of the optical module.

* * * * *